US012768932B2

(12) United States Patent
Rao et al.

(10) Patent No.: US 12,768,932 B2
(45) Date of Patent: Oct. 20, 2026

(54) PRESERVATION OF POSITIONING INTEGRITY ASSOCIATED WITH WIRELESS SYSTEMS

(71) Applicant: InterDigital Patent Holdings, Inc., Wilmington, DE (US)

(72) Inventors: Jaya Rao, Montreal (CA); Fumihiro Hasegawa, Westmount (CA); Tuong Duc Hoang, Montreal (CA); Aata El Hamss, Laval (CA); Moon-Il Lee, Melville, NY (US); Ghyslain Pelletier, Montreal (CA); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 448 days.

(21) Appl. No.: 18/284,971

(22) PCT Filed: Mar. 30, 2022

(86) PCT No.: PCT/US2022/022520

§ 371 (c)(1),
(2) Date: Sep. 29, 2023

(87) PCT Pub. No.: WO2022/212484

PCT Pub. Date: Oct. 6, 2022

(65) Prior Publication Data

US 2024/0192304 A1 Jun. 13, 2024

Related U.S. Application Data

(60) Provisional application No. 63/257,316, filed on Oct. 19, 2021, provisional application No. 63/249,678, (Continued)

(51) Int. Cl.
*G01S 5/02* (2010.01)

(52) U.S. Cl.
CPC .......... *G01S 5/0244* (2020.05); *G01S 5/0268* (2013.01)

(58) Field of Classification Search
CPC ...... G01S 5/0244; G01S 5/0268; G01S 5/021; G01S 5/0249
See application file for complete search history.

(56) References Cited

U.S. PATENT DOCUMENTS 9,797,983 B1 10/2017 Bitra et al.
2002/0080069 A1 * 6/2002 Stilp .................... H04W 64/00 342/465

(Continued)

OTHER PUBLICATIONS

3rd Generation Partnership Project (3GPP), TS 38.305 V16.1.0, "Technical Specification Group Radio Access Network, NG Radio Access Network (NG-RAN), Stage 2 Functional Specification of User Equipment (UE) Positioning in NG-RAN (Release 16)", Jul. 2020, pp. 1-114.

(Continued)

*Primary Examiner* — Cassi J Galt
(74) *Attorney, Agent, or Firm* — Condo Roccia Koptiw LLP

(57) ABSTRACT

A wireless transmit/receive unit (WTRU) and a method are described herein regarding preservation of positioning integrity associated with wireless systems. Using multiple positioning configurations and/or schemes (e.g., positioning reference signal (PRS) configurations/schemes), e.g., based on a switching pattern, may ensure integrity (e.g., adequate and/or robust integrity), for example, if error events (e.g., low reference signal received power, blockage of PRS from transmission/reception points (TRPs), etc.) have a persistent duration. The WTRU comprises a processor configured to receive a first, a second and a third subset of PRS configuration information, receive configuration information indicating error source information, a first switching pattern, and (Continued)

Switching Pattern between 2 positioning schemes a positioning uncertainty threshold, perform a first set of measurements using the first switching pattern and the first and second subsets of PRS configuration information, determine a first positioning uncertainty based on the first set of measurements and the error source information, and send an indication indicating measurement information and positioning uncertainty information.

20 Claims, 9 Drawing Sheets

Related U.S. Application Data filed on Sep. 29, 2021, provisional application No. 63/167,958, filed on Mar. 30, 2021.

(56) References Cited

U.S. PATENT DOCUMENTS

2014/0221005 A1 8/2014 Marshall et al.
2022/0069962 A1* 3/2022 Bao ........................ H04L 5/0051

OTHER PUBLICATIONS

3rd Generation Partnership Project (3GPP), TS 38.331 V16.1.0, “Technical Specification Group Radio Access Network, NR, Radio Resource Control (RRC) Protocol Specification (Release 16)”, Jul. 2020, pp. 1-906.

* cited by examiner

PRESERVATION OF POSITIONING INTEGRITY ASSOCIATED WITH WIRELESS SYSTEMS

CROSS-REFERENCE TO RELATED APPLICATIONS

This application is the National Stage Entry under 35 U.S.C. § 371 of Patent Cooperation Treaty Application No. PCT/US2022/022520, filed Mar. 30, 2022, which claims the benefit of U.S. Provisional Application 63/167,958, filed Mar. 30, 2021, U.S. Provisional Application 63/249,678, filed Sep. 29, 2021, and U.S. Provisional Application 63/257,316, filed Oct. 19, 2021, the contents of which are incorporated by reference as if fully set forth.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities are described herein regarding preservation of positioning integrity associated with wireless systems. Using multiple positioning configurations and/or schemes (e.g., positioning reference signal (PRS) configurations/schemes) may ensure integrity (e.g., adequate and/or robust integrity). Multiple positioning schemes and/or configurations may ensure integrity, for example, if error events (e.g., low reference signal received power, blockage of PRS from transmission/reception points (TRPs), etc.) have a persistent duration (e.g., long duration). Enforcing high integrity using a single positioning scheme and/or configuration may be inefficient and/or expensive (e.g., high latency, high resource usage, high power, unpredictable rise of uncertainty). Positioning integrity using multiple positioning schemes (e.g., based on a switching pattern) may be supported for a wireless system (e.g., wireless transmit/receive unit (WTRU)).

A WTRU may be configured (e.g., comprise a processor) to support multiple positioning schemes and/or configurations. A WTRU may be configured to receive a first subset of PRS configuration information, a second subset of PRS configuration information, and a third subset of PRS configuration information. The subsets of PRS configuration information may indicate respective sets of TRPs. The subsets of PRS configuration information may indicate respective sets of PRS resources and/or PRS parameters. The WTRU may be configured to receive configuration information, for example, that may indicate error source information, a switching pattern, a positioning uncertainty threshold, and/or a maximum time duration. The WTRU may be configured to perform a first set of measurements, for example, using the first switching pattern, the first subset of PRS configuration information, and the second subset of PRS configuration information. The WTRU may be configured to determine a first positioning uncertainty based on the first set of measurements and the error source information. The WTRU may be configured to send an indication indicating measurement information and positioning uncertainty information. The measurement information may indicate the first set of measurements, the first PRS configuration information, the second PRS configuration information, and/or the first switching pattern. The positioning uncertainty information may indicate the first positioning uncertainty.

The WTRU may be configured to perform additional measurements, for example, using different PRS configuration information and/or switching patterns. The WTRU may be configured to determine that the first positioning uncertainty is greater than the positioning uncertainty threshold. The WTRU may be configured to determine that there is an error source (e.g., a TRP indicated in the first subset of the PRS configuration information) associated with the first subset of PRS configuration information, for example, based on the first set of measurements and a threshold indicated in the error source information. The WTRU may be configured to select (e.g., based on the determination that there is an error source associated with the first subset of PRS configuration and a determination that a third set of measurements (e.g., from the first set of measurements) associated with the second subset of PRS configuration information are valid) the second subset of PRS configuration information and the third subset of configuration information to perform the second set of measurements. The WTRU may be configured to determine a second switching pattern, for example, based on the second subset of PRS configuration information, the third subset of PRS configuration information, and the maximum time duration. The WTRU may be configured to perform a second set of measurements using the second subset of PRS configuration information and the third subset of PRS configuration information. The WTRU may be configured to perform the second set of measurements using the second switching pattern (e.g., with the second subset of PRS configuration information and the third subset of PRS configuration information. The WTRU may be configured to determine a second positioning uncertainty, for example, based on the second set of measurements and the error source information. The WTRU may be configured to send the measurement information and/or the positioning uncertainty information. The measurement information may indicate the first set of measurements, the second set of measurements, the second PRS configuration information, the third PRS configuration, the first switching pattern, and/or the second switching pattern. The positioning uncertainty information may include the first positioning uncertainty and/or the second positioning uncertainty.

The WTRU may be configured to perform additional measurements using The WTRU may be configured to determine that the first positioning uncertainty is greater than the positioning uncertainty threshold. The WTRU may be configured to determined that there is a first error source associated with the first subset of PRS configuration information and a second error source associated with the second subset of PRS configuration information. The determination on error sources may be performed based on the first set of measurements, a first threshold indicated by the error source information, and/or a second threshold indicated by the error source information. The WTRU may be configured to select the third subset of PRS configuration information. The WTRU may be configured to select the third subset of PRS configuration information, for example, based on the determination that there is a first error source associated with the first subset of configuration information and a second error source associated with the second subset of configuration information. The WTRU may be configured to perform a second set of measurements, for example, using the third subset of PRS configuration information. The WTRU may be configured to determine a second positioning uncertainty, for example, based on the second set of measurements and/or the error source information. The measurement information sent by the WTRU may include the second set of measurements. The measurement information sent by the WTRU may include the second set of measurements and the third subset of PRS configuration information. The positioning uncertainty information sent by the WTRU may include the second positioning uncertainty.

DETAILED DESCRIPTION

Figure 1A:
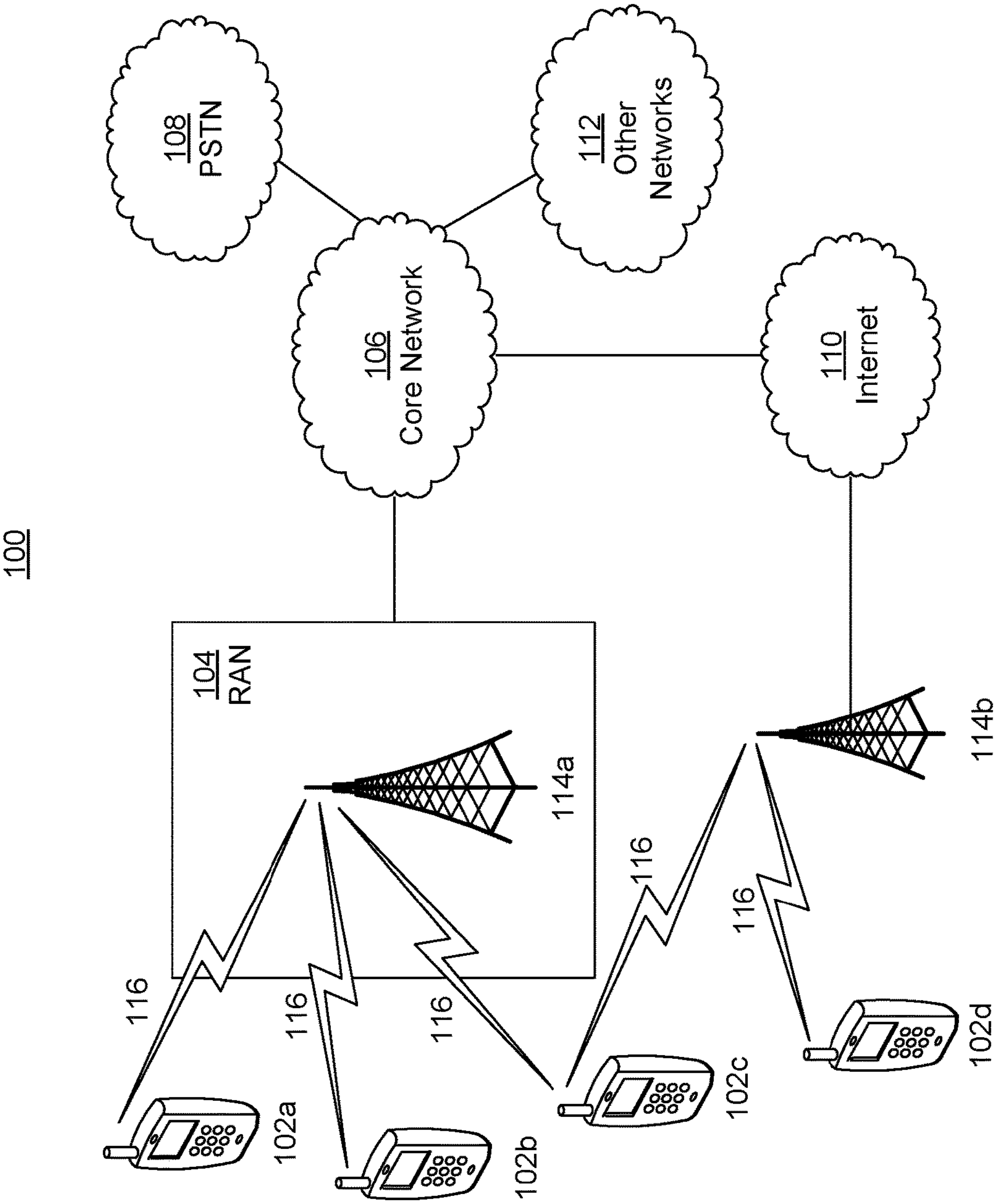
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform (DFT)-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a “station” and/or a “STA”, may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c*, and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
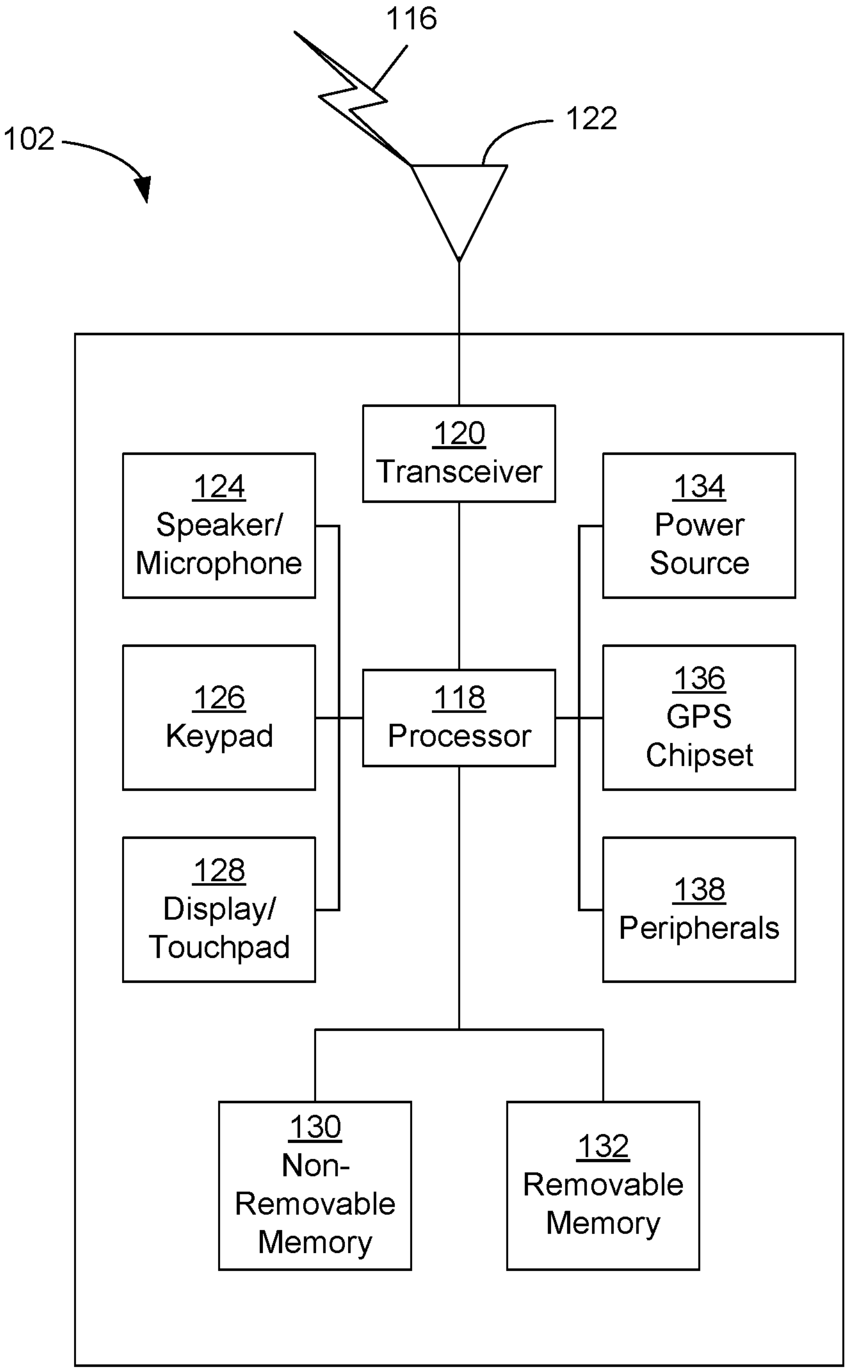
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Figure 1C:
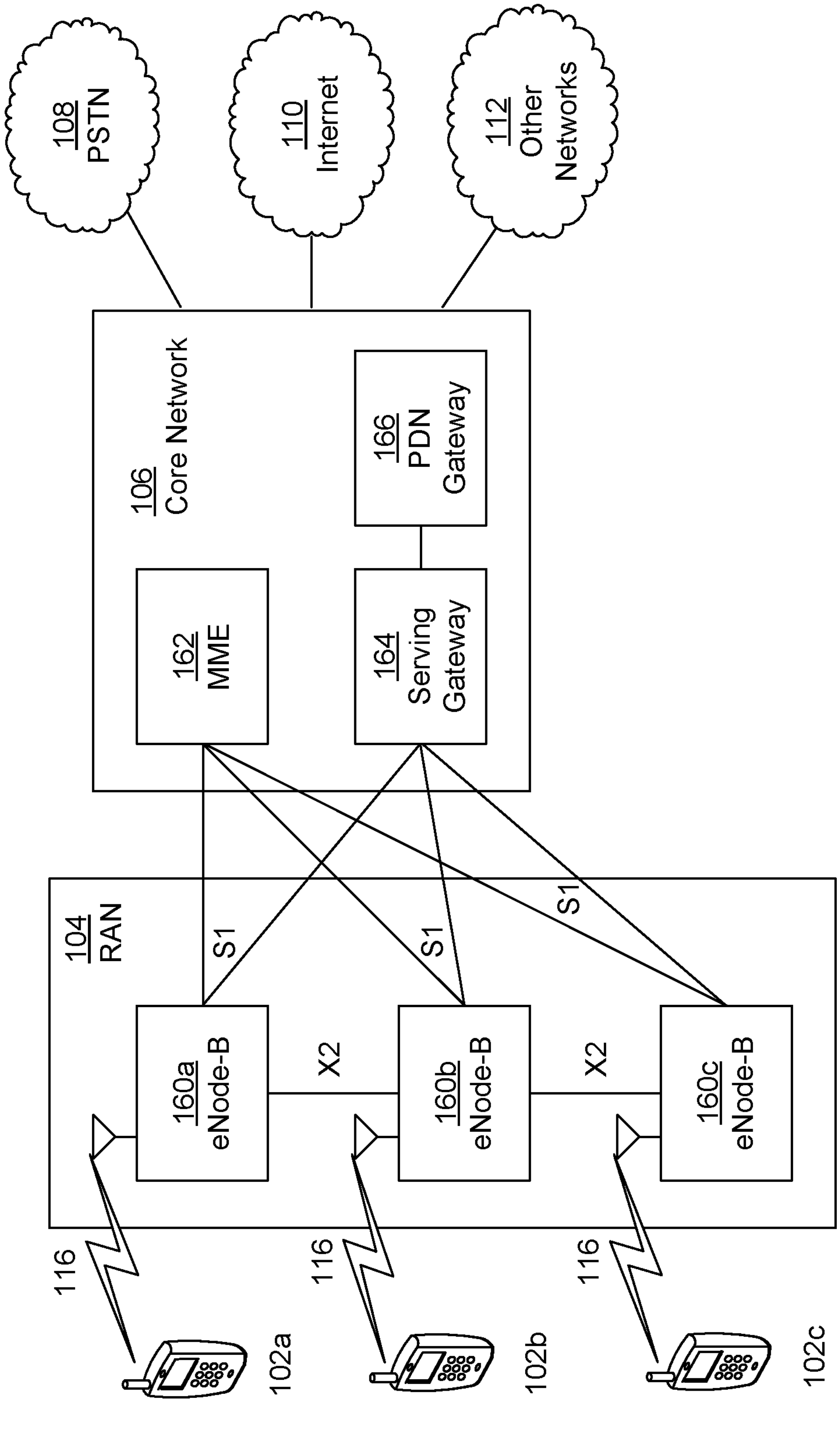
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHz, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
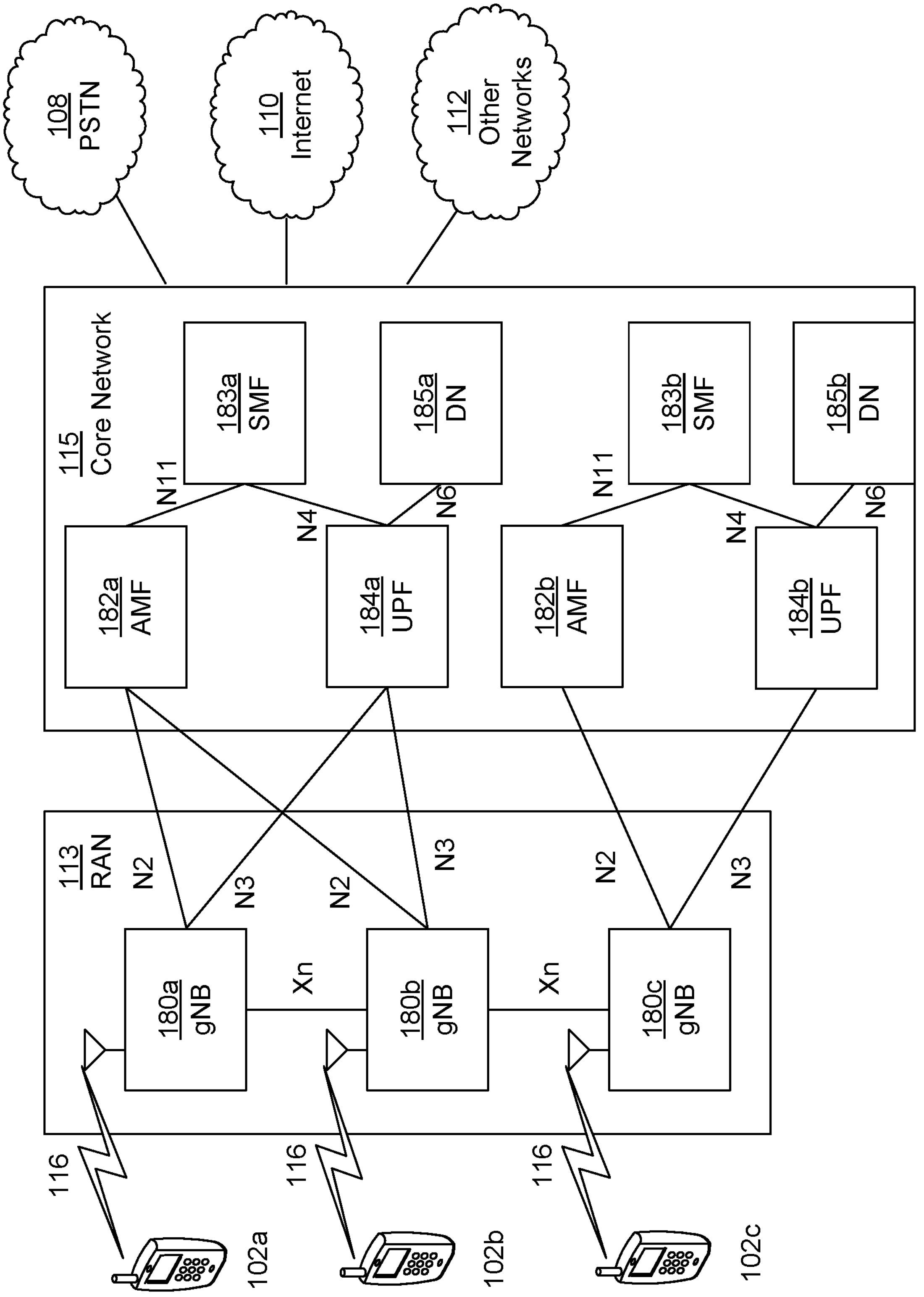
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are described herein regarding preservation of positioning integrity associated with wireless systems. Using multiple positioning configurations and/or schemes (e.g., positioning reference signal (PRS) configurations/schemes) may ensure integrity (e.g., adequate and/or robust integrity). Multiple positioning schemes and/or configurations may ensure integrity, for example, if error events (e.g., low reference signal received power, blockage of PRS from transmission/reception points (TRPs), etc.) have a persistent duration (e.g., long duration). Enforcing high integrity using a single positioning scheme and/or configuration may be inefficient and/or expensive (e.g., high latency, high resource usage, high power, unpredictable rise of uncertainty). Positioning integrity using multiple positioning schemes (e.g., based on a switching pattern) may be supported for a wireless system (e.g., wireless transmit/receive unit (WTRU).

A WTRU may be configured (e.g., comprise a processor) to support multiple positioning schemes and/or configurations. A WTRU may be configured to receive a first subset of PRS configuration information, a second subset of PRS configuration information, and a third subset of PRS configuration information. The subsets of PRS configuration information may indicate respective sets of TRPs. The subsets of PRS configuration information may indicate respective sets of PRS resources and/or PRS parameters. The WTRU may be configured to receive configuration information, for example, that may indicate error source information, a switching pattern, a positioning uncertainty threshold, and/or a maximum time duration. The WTRU may be configured to perform a first set of measurements, for example, using the first switching pattern, the first subset of PRS configuration information, and the second subset of PRS configuration information. The WTRU may be configured to determine a first positioning uncertainty based on the first set of measurements and the error source information. The WTRU may be configured to send an indication indicating measurement information and positioning uncertainty information. The measurement information may indicate the first set of measurements, the first PRS configuration information, the second PRS configuration information, and/or the first switching pattern. The positioning uncertainty information may indicate the first positioning uncertainty.

The WTRU may be configured to perform additional measurements, for example, using different PRS configuration information and/or switching patterns. The WTRU may be configured to determine that the first positioning uncertainty is greater than the positioning uncertainty threshold. The WTRU may be configured to determine that there is an error source (e.g., a TRP indicated in the first subset of the PRS configuration information) associated with the first subset of PRS configuration information, for example, based on the first set of measurements and a threshold indicated in the error source information. The WTRU may be configured to select (e.g., based on the determination that there is an error source associated with the first subset of PRS configuration and a determination that a third set of measurements (e.g., from the first set of measurements) associated with the second subset of PRS configuration information are valid) the second subset of PRS configuration information and the third subset of configuration information to perform the second set of measurements. The WTRU may be configured to determine a second switching pattern, for example, based on the second subset of PRS configuration information, the third subset of PRS configuration information, and the maximum time duration. The WTRU may be configured to perform a second set of measurements using the second subset of PRS configuration information and the third subset of PRS configuration information. The WTRU may be configured to perform the second set of measurements using the second switching pattern (e.g., with the second subset of PRS configuration information and the third subset of PRS configuration information. The WTRU may be configured to determine a second positioning uncertainty, for example, based on the second set of measurements and the error source information. The WTRU may be configured to send the measurement information and/or the positioning uncertainty information. The measurement information may indicate the first set of measurements, the second set of measurements, the second PRS configuration information, the third PRS configuration, the first switching pattern, and/or the second switching pattern. The positioning uncertainty information may include the first positioning uncertainty and/or the second positioning uncertainty.

The WTRU may be configured to perform additional measurements using The WTRU may be configured to determine that the first positioning uncertainty is greater than the positioning uncertainty threshold. The WTRU may be configured to determined that there is a first error source associated with the first subset of PRS configuration information and a second error source associated with the second subset of PRS configuration information. The determination on error sources may be performed based on the first set of measurements, a first threshold indicated by the error source information, and/or a second threshold indicated by the error source information. The WTRU may be configured to select the third subset of PRS configuration information. The WTRU may be configured to select the third subset of PRS configuration information, for example, based on the determination that there is a first error source associated with the first subset of configuration information and a second error source associated with the second subset of configuration information. The WTRU may be configured to perform a second set of measurements, for example, using the third subset of PRS configuration information. The WTRU may be configured to determine a second positioning uncertainty, for example, based on the second set of measurements and/or the error source information. The measurement information sent by the WTRU may include the second set of measurements. The measurement information sent by the WTRU may include the second set of measurements and the third subset of PRS configuration information. The positioning uncertainty information sent by the WTRU may include the second positioning uncertainty.

A wireless transmit/receive unit (WTRU) may be used in preservation of positioning integrity in wireless systems. The WTRU may send capability information for integrity to a base station (e.g., an LMF/gNB). The WTRU may receive positioning reference signal (PRS) configuration information associated with a scheme (e.g., a primary scheme and a secondary scheme) from the base station. The WTRU may receive integrity configuration information. The integrity configuration information may include at least one of a KPI and information on an error source, a time duration for determining integrity by switching, or an integrity reporting configuration. The WTRU may determine a positioning integrity based on measurements made using the PRS configuration information, integrity configuration information, and a switching pattern. The WTRU may send an integrity result to the base station according to the integrity reporting configuration.

The WTRU may support positioning integrity, for example, using multiple positioning schemes based on a switching pattern. The WTRU may use multiple configured positioning schemes for determining positioning integrity. The WTRU may determine integrity with multiple positioning schemes which may have a degree of overlap. The WTRU may be configured with a switching pattern that may be used with multiple positioning schemes for integrity. The WTRU may be configured to send an integrity report, for example, if using multiple positioning schemes. The WTRU may determine the switching pattern for integrity to be used with multiple positioning schemes. The WTRU may (e.g., dynamically) switch to a different positioning scheme, for example, if the WTRU detects a switching condition. The WTRU may determine a positioning source(s) to be included/excluded into positioning schemes for ensuring integrity. The WTRU may ensure integrity using (e.g., multiple) DL-based positioning schemes. The WTRU may integrity using (e.g., multiple) UL-based positioning schemes. The WTRU may ensure integrity using a DL and UL based positioning scheme. The WTRU may be configured with an integrity recovery configuration to be applied during an integrity failure condition.

The WTRU may support positioning integrity with multiple positioning configurations, for example, based on (e.g., dynamic) selection (e.g., reselection) of positioning configurations. The WTRU may select (e.g., reselect) a positioning configuration/scheme, for example, from a configured set/pool (e.g., based on detection of a configured triggering condition). Triggering conditions for selecting/switching positioning configurations for determining integrity may be provided. The WTRU may select (e.g., reselect) a positioning configuration for integrity, for example, based on a configured selection window. The WTRU may select (e.g., reselect) a positioning configuration(s), for example, based on associated priority values.

The WTRU may send capability information for positioning integrity. The capability information may be associated with supporting positioning integrity using different positioning operations. The capability information may include one or more of a type(s) of positioning operation(s) supported; a number of positioning operations supported; a bandwidth that can be utilized for positioning; a time duration for measurements; a support for different positioning modes; and/or support for positioning integrity.

The WTRU may send an integrity report (e.g., to a network), for example, based on an integrity reporting configuration. The integrity report may include positioning operations/configurations applied if/when supporting positioning integrity, a calculated/determined integrity result, an integrity indication/flag, information on a switching pattern, a measurement used for determining/calculating integrity results, information related to error events/integrity events/error sources, and/or information on whether a recovery method/configuration is applied.

The WTRU may isolate error sources, for example, if/when supporting positioning integrity. The WTRU may isolate measurements made from detected error sources/error events. The WTRU may isolate error sources, for example, based on one or more of the following: the type of error source; measurements associated with the error sources; or the type of positioning operations.

The WTRU may determine positioning uncertainty/integrity using multiple PRS configurations and a switching pattern. The WTRU may determine a switching pattern to apply, for example, if/when determining positioning uncertainty. The WTRU may use a preconfigured recovery configuration, for example, for maintaining integrity performance. The WTRU may determine a secondary PRS configuration to be used along with a primary PRS configuration, for example, based on a configured selection time window and priority.

Position integrity may be ensured and/or enforced, e.g., in a timely manner (e.g., at a wireless transmit/receive unit (WTRU). Position integrity may be ensured and/or enforced (e.g., in a timely manner at a WTRU), e.g., if supporting WTRU-based positioning.

A WTRU may use positioning schemes (e.g., primary and/or secondary positioning schemes), e.g., based on a switching pattern. A WTRU may use positioning schemes (e.g., primary and/or secondary positioning schemes) based on a switching pattern to ensure integrity (e.g., by cross comparison and statistically spreading out potential error sources).

An alternative scheme may be used as a primary scheme (e.g., until recovery from a failure condition). If one of the positioning schemes experience a failure condition (e.g. a location uncertainty is greater than an integrity threshold (location uncertainty>integrity threshold), an alternative scheme may be used as a primary scheme until recovery from the failure condition.

A WTRU may determine position integrity. A WTRU may determine position integrity, e.g., by using positioning scheme configurations (e.g., at least primary and secondary positioning scheme configurations). A WTRU may determine position integrity by using positioning scheme configurations based on an integrity configuration. An integrity configuration may include an integrity key performance indicator(s) (KPIs), a time (e.g., max time) for determining integrity, and/or an integrity reporting configuration. A WTRU may determine position integrity by using positioning scheme configurations based on a switching pattern. A switching pattern may be used for switching between primary and secondary schemes. A WTRU may determine position integrity by using positioning scheme configurations based on an integrity configuration and/or a switching pattern.

A WTRU may send capability information (e.g., for integrity), for example, to a location management function (LMF). For example, a WTRU may send capability information for integrity to an LMF which may include capability for supporting positioning schemes (e.g., multiple positioning schemes). For example, a WTRU may send capability information for integrity to an LMF which may include a bandwidth (e.g., a max bandwidth) for making positioning measurements. A WTRU may send capability information for integrity to an LMF which may include capability for supporting positioning schemes and a bandwidth.

A WTRU may receive positioning reference signal (PRS) configuration information associated with primary and/or secondary schemes from an LMF.

A WTRU may receive integrity configuration information. A WTRU may use an integrity configuration with the primary and/or secondary schemes. An integrity configuration may include at least one of the following: integrity KPIs (e.g. an alert level (AL) and information on error sources (e.g., an uncertainty and/or at TRPs), a time duration (e.g., maximum time duration) for determining integrity by switching (e.g., including measurement/processing time for the primary method, a switching time, measurement/processing time for the secondary method, and/or calculation time), or integrity reporting configuration information (e.g., tagging primary/secondary schemes in a report, reporting periodicity if combining primary and secondary schemes).

The WTRU may determine positioning integrity, e.g., based on the measurements made using PRS configurations of the respective primary and secondary schemes, integrity configuration, and switching pattern. The WTRU may determine a switching pattern, e.g., for switching between primary and secondary schemes such that a measurement/calculation duration (e.g., total measurement/calculation duration) may fit within the time duration (e.g., maximum time duration) for determining integrity by switching. The measurement duration for a positioning scheme may be a function of a WTRU radio environment and detected measurement errors.

The WTRU may send integrity results to an LMF. The WTRU may send integrity results to an LMF, e.g., according to the integrity reporting configuration information. The WTRU may be configured with the integrity reporting configuration. The integrity reporting configuration information may be used in a WTRU-based scheme or a WTRU-assisted scheme. There may be an exchange between an LMF and a WTRU interface (e.g., an LTE Positioning Protocol (LPP). A WTRU may determine rules for using a scheme and/or sending a report.

A WTRU (e.g., a WTRU configured with a primary and secondary positioning scheme for integrity) may transition to use an integrity recovery configuration. A WTRU may transition to use an integrity recovery configuration, e.g., based on the detection of at least one error event associated with the configured positioning schemes.

A WTRU may receive configuration information for primary and secondary positioning schemes e.g., for supporting integrity with an integrity recovery configuration. The integrity recovery configuration may include at least one PRS configuration associated with the primary and secondary positioning scheme (e.g., a different PRS measurement duration within a max duration), a use of an extended/alternative TRP set per scheme, and/or a new switching pattern to be applied during a recovery mode.

A WTRU may use an integrity recovery configuration associated with the primary and secondary schemes in a recovery mode, e.g., if at least one error event (e.g., measurements indicated an increase in positioning uncertainty) is detected. In examples, an error event may be detected based on fluctuations in PRS measurements (e.g., received from a TRP) associated with a primary/secondary scheme and the like. The WTRU may monitor (e.g., continue to monitor) the failure event. The WTRU may continue to monitor the failure event, e.g., by making measurements from the impacted positioning source (e.g., a TRP) and isolating the measurements from the integrity result.

The WTRU may report measurements associated with an error event to an LMF (e.g., ID TRPs impacted by errors, a duration applied for making PRS measurements from TRPs impacted by errors).

The WTRU may transition to using the primary and secondary positioning schemes if error events are mitigated.

Downlink, uplink, and downlink and uplink positioning methods may be specified.

In downlink positioning methods, reference signal(s) (e.g., PRS(s)) may be sent from a TRP (e.g., multiple TRPs) to a WTRU. The WTRU may observe reference signals (e.g., multiple reference signals) and/or measure a time difference of arrival (TDoA) between PRSs (e.g., a pair of PRSs). The WTRU may return a measured reference signal time difference (RSTD) to an LMF. A WTRU may return a measured reference signal received power (RSRP) for a PRS (e.g., each PRS). An LMF may conduct positioning of the WTRU, e.g., based on the returned measurements. A WTRU may report an RSRP for downlink (DL) angle-based positioning operations (e.g., methods).

In examples, an LMF may be a node or entity (e.g., a network node or network entity). The LMF may be used for or to support positioning. A different node or entity (e.g., any other node or entity) may be substituted for an LMF.

A WTRU may send a sounding reference signal (SRS) for positioning (SRSp), which may be configured by radio resource control (RRC), to reception points (RPs), e.g., in uplink positioning operations (e.g., methods). A TRP may measure a relative time of arrival (RTOA) for a received SRS and report the measured values to an LMF, e.g., in timing-based methods. A WTRU may report an RSRP for an SRS. An RP may measure angles of arrival and report to an LMF, e.g., in angle-based uplink positioning operations (e.g., methods).

A WTRU may measure a receive-transmit (Rx-Tx) time difference between a PRS (e.g., received PRS) and an SRS (e.g., transmitted SRS), e.g., in the uplink and downlink positioning operation (e.g., method). A WTRU may report a Rx-Tx time difference to an LMF. A WTRU may report a measured RSRP for a PRS. At a TRP, a Rx-Tx difference between a received SRS and a transmitted PRS may be computed.

The following positioning operations (e.g., methods) may be considered: a DL positioning operation, an uplink (UL) positioning operation, and/or a DL and UL positioning operation.

A DL positioning opeartion may refer to a positioning operation (e.g., any positioning operation) that uses downlink reference signals (e.g., a PRS). The WTRU may receive reference signals (e.g., multiple reference signals) from a transmission point (TP) and measure a DL RSTD and/or RSRP. In examples, DL positioning operations may be DL angle of departure (DL-AoD) or DL-TDoA positioning.

A UL positioning operation may refer to a positioning operation (e.g., any positioning operation) that uses uplink reference signals (e.g., an SRS) for positioning. The WTRU may transmit an SRS to multiple RPs, and the RPs may measure the UL RToA and/or RSRP. In examples, UL positioning operations may be UL-TDoA or UL angle of arrival (UL-AoA) positioning.

A DL and UL positioning operation may refer to a positioning operation (e.g., any positioning operation) may use (e.g., both) uplink and downlink reference signals for positioning. In examples, a WTRU may transmit an SRS to multiple TRPs, and a gNB may measure an Rx-Tx time difference for a PRS transmitted from multiple TRPs. A WTRU may measure an RSRP for the received PRS. The Rx-Tx difference may be used to compute a time (e.g., round trip time). An RSRP measured at a WTRU and gNB may be used to compute round trip time. An Rx-Tx difference may refer to the difference between an arrival time of the reference signal transmitted by the TRP and a transmission time of the reference signal transmitted from the WTRU. In examples, a DL and UL positioning operation may be multi round trip time (RTT)

A network may include an access and mobility management function (AMF), an LMF, or a next generation radio access network (NG-RAN).

A positioning integrity may be a measure of trust. A positioning integrity may be a measure of trust in the accuracy of data. A positioning integrity may be a measure of trust in the accuracy of the position-related data provided by the positioning system. A positioning integrity may be a measure of trust in the accuracy of the ability to provide warnings (e.g., timely and/or valid warnings) to the location services (LCS) client. A positioning integrity may be a measure of trust in the accuracy of the ability to provide timely and valid warnings to the location services (LCS) client, for example, if the positioning system does not fulfil the condition for intended operation. A positioning integrity may be a measure of the trust in the accuracy of the position-related data provided by the positioning system and the ability to provide timely and valid warnings to the LCS client, for example, if the positioning system does not fulfil the condition for intended operation An integrity availability may be a percentage of time that a protection limit (PL) is below an alert level (AL) (e.g., a threshold alert level, required alert level).

An error event may be a possible event (e.g., all possible events), that can cause a computed position to deviate from a position (e.g., the true position), regardless of whether a fault (e.g., specific fault) may be identified in one of the positioning systems. An error event may be a possible event of natural, system, or operational nature.

A target integrity risk (TIR) may be the probability that the positioning error exceeds the AL, for example, without warning the user within a time-to-alert (TTA). The TIR may be defined as a probability rate per some time unit (e.g., per hour, per second, or per independent sample).

An AL may be an allowable positioning error (e.g., maximum allowable positioning error) such that the positioning system is available for an application (e.g., an intended application). If a positioning error is beyond an AL, the positioning system may be declared unavailable for an application (e.g., the intended application), for example, to prevent loss of positioning integrity. If the AL bounds the positioning error in the horizontal plane or on the vertical axis, the AL may be called a horizontal alert limit (HAL) or vertical alert limit (VAL) respectively.

A TTA may be an allowable elapsed time (e.g., maximum allowable elapsed time), for example, from when a positioning error exceeds an AL until the functioning providing positioning integrity annunciates a corresponding alert.

A misleading information (MI) event may occur, for example, if a positioning error exceeds a PL (e.g., if a positioning system is declared unavailable). A hazardous MI (HMI) event may occur, for example, if a positioning error exceeds an AL without announcing an alert within a TTA (e.g., if a positioning system is declared unavailable). An integrity event may occur, for example, if a positioning system outputs HMI.

A PL may be an upper-bound (e.g., statistical upper-bound) of a positioning error (PE). The PL may ensure that the probability per unit of time of an error (e.g., true error) being greater than an AL and the PL being less than or equal to the AL, for longer than the TTA, is less than the TIR, (e.g., the PL satisfies the probability per unit of time [(PE>AL) & (PL>AL) for longer than TTA]<required TIR). If the PL bounds the positioning error in the horizontal plane or on the vertical axis, then the PL may be called a horizontal protection level (HPL) or vertical protection level (VPL) respectively.

WTRU-based and LMF-based positioning integrity may be supported, e.g., for RAT-independent global navigation satellite system (GNSS) positioning. The WTRU behavior and procedures for supporting positioning integrity with low latency for both RAT-independent and RAT-dependent positioning may be unknown.

It may be helpful to avoid scenarios that may result in failure (e.g., catastrophic failure) in positioning (e.g., positioning error exceeds the error bound guaranteed by a positioning system). It may be helpful to ensure and/or enforce positioning integrity (e.g., in a timely manner) at the WTRU, e.g., if determining positioning information (e.g., measurements, a location) based on the integrity KPIs/parameters (e.g., AL, TTA, TIR) and information on error sources and/or error events.

It may be helpful to ensure that a degree of uncertainty in the WTRU location is below an integrity requirement threshold (e.g., always below an integrity requirement threshold). Dimensions of a positioning uncertainty region (e.g., a three-dimensional ball, an ellipsoid) may be a function of error bounds/margins corresponding to a measurement configuration (e.g., a set of TRPs) used by a WTRU for positioning. Dimensions of a positioning uncertainty region may vary, e.g., due to multipath, WTRU mobility, and the like. Using a measurement configuration (e.g., incorrect measurement configuration) may result in the uncertainty in the WTRU location exceeding an integrity threshold. In examples, integrity may be quantified, e.g., using standard deviations observed in measurements or estimated positions. In examples, integrity may be used in autonomous driving, e.g., where a vehicle may be kept within certain error bounds to prevent accidents.

Relying on a single positioning operation/configuration may not be adequate and robust for ensuring and/or enforcing integrity, e.g., if error events caused by error sources have a long persistence duration. Enforcing a (e.g., high) level of positioning integrity (e.g., low uncertainty in WTRU location information) using a single positioning method/scheme may be inefficient and expensive (e.g., high latency, resource usage, high power, unpredictable rise of uncertainty). A WTRU may not be able to use multiple positioning methods/schemes concurrently, e.g., for achieving integrity. If the positioning methods are applied sequentially, the resulting latency may lead to a wrong PL calculation.

If using multiple/hybrid positioning methods/schemes for enforcing integrity, ensuring a redundant positioning method/scheme to be sufficiently robust and independent of a primary positioning method scheme (e.g., such that the measurements are not cross-contaminated) may be a challenge.

An SRS for position may refer herein to an SRS signal/transmission used for positioning. Resources for an SRS for positioning (SRSp) may be defined (e.g., signaled), for example, via RRC signaling. An SRS resource set and/or an SRS resource configured for positioning may be specified. An SRS for positioning and/or an SRS may include at least one of the following: an SRS which may be configured under SRS-PosResourceSet-r16 and SRS-PosResource-r16, an SRS which may be configured under SRS-ResourceSet and SRS-Resource, an SRS which may not be configured under SRS-PosResourceSet-r16 and SRS-PosResource-16, an SRS which may not be configured under SRS-ResourceSet and SRS-Resource, an SRS which may not be associated with SRS-PosResourceSet-16, SRS-PosResource-r16, SRS-ResourceSet, or SRS-Resource, an uplink reference signal that is associated with positioning, a demodulation reference signal (DM-RS) for uplink, or a phase tracking reference signal (PTRS) for uplink.

A PRS or an SRS may be an RS used for positioning and/or used for something other than positioning. The operations (e.g., methods) described herein may be applied to or used with DL or UL reference signals (e.g., any DL or UL reference signals).

Positioning configuration information may be provided. Positioning configuration information may include a set of information related to positioning measurement and/or SRSp transmission. Positioning configuration information may include one or more of the following: one or more of a positioning operation (e.g., method) used (e.g., DL-TDoA, UL-TDoA, DL-AOD, UL-AoA, multi-RTT), PRS configuration information, SRSp configuration information, an uplink resource (e.g., a physical random access channel (PRACH), a physical uplink shared channel (PUSCH), a physical uplink control channel (PUCCH) to report the positioning measurement, one or more threshold values to determine the positioning measurement quality, or a positioning mode of operation (e.g., a starting positioning mode of operation).

PRS resource configuration information may include at least one of the following: a PRS resource ID, a PRS sequence ID or other IDs used to generate a PRS sequence, a PRS resource element offset, a PRS resource slot offset, a PRS symbol offset, PRS quasi-colocation (QCL) information, a PRS resource set ID, a list of PRS resources in the resource set, a number of PRS symbols, a muting pattern for a PRS or muting parameters (e.g., a repetition factor, muting options), a PRS resource power, a periodicity of a PRS transmission, spatial direction information of a PRS transmission (e.g., beam information, angles of transmission), or spatial direction information of a UL RS reception (e.g., a beam ID used to receive a UL RS, an angle of arrival).

SRSp resource configuration information may include at least one of the following: a resource ID, comb offset values, cyclic shift values, a start position (e.g., in the frequency domain), a number of SRSp symbols, a shift in the frequency domain for SRSp, a frequency hopping pattern, a type of SRSp (e.g., an aperiodic SRSp, a semi-persistent SRSp, or a periodic SRSp), a sequence ID used to generate an SRSp or other IDs used to generate an SRSp sequence, spatial relation information indicating which reference signal the SRSp is related to spatially, a resource set ID, a list of SRSp resources in the resource set, transmission power related information, pathloss reference information which may contain an index for a synchronization signal block (SSB), a channel state information (CSI-RS) or a PRS, a periodicity of an SRSp transmission, spatial direction information of an SRSp transmission (e.g., beam information, angles of transmission), or spatial direction information of a DL RS reception (e.g., a beam ID used to receive a DL RS, angle of arrival).

The WTRU may receive information (e.g., as a part of configuration information) related to the cell ID, global cell ID, or TRP ID which may be associated with a PRS. In examples, the TRP (e.g., TRP which transmits a PRS) may be identified (e.g., by the TRP ID), which may belong to a cell identified by the cell ID. A WTRU may be configured with timing information, e.g., a system frame number (SFN) offset for a PRS or an SRSp transmission. The offset may be introduced, e.g., to prevent the WTRU from receiving overlapping PRS in the time domain.

Positioning operation and positioning scheme may, interchangeably, refer to using positioning configuration information (e.g., positioning configuration, such as a DL-PRS or a UL-SRSp) for making positioning measurements and/or determining location information.

Operations for supporting positioning and integrity may be provided. In WTRU-based positioning, the WTRU may determine and/or calculate WTRU location information (e.g., geographic coordinates), e.g., based on positioning configuration information (e.g., positioning configuration, such as a PRS or an SRSp) provided by a network (e.g., in assistance data) to a WTRU and the measurements made by the WTRU and/or the network. The WTRU-based positioning may be referred to as network-assisted positioning.

In LMF-based or network-based positioning, the network (e.g., an LMF or an RAN) may determine and/or calculate the WTRU location information (e.g., geographic coordinates), e.g., based on the positioning related measurements (e.g., a PRS or an SRSp) made by the WTRU and/or network. The LMF/network-based positioning may be referred to as WTRU-assisted positioning.

In WTRU-based integrity, the integrity metrics (e.g., a PL) may be calculated or estimated at the WTRU. WTRU-based integrity may be referred to as network-assisted integrity. In LMF-based or network-based integrity, the integrity metrics (e.g., a PL) may be calculated or estimated at the network (e.g., an LMF or an RAN). LMF/network-based integrity may be referred to as WTRU-assisted integrity.

In examples, an LMF may be a node or entity (e.g., a network node or entity). The LMF may be used for or to support positioning and/or positioning integrity. A different node or entity (e.g., any other node or entity) may be substituted for an LMF.

An operation for determining integrity and/or uncertainty in positioning information may be provided. The terms integrity and positioning integrity may be used interchangeably, e.g., to refer to the accuracy of the positioning information of the WTRU which may be determined using one or more positioning operations, schemes, or configurations. In examples, integrity may be related to and referred to as a positioning uncertainty or uncertainty in positioning information. There may be a relationship between positioning integrity and positioning uncertainty.

In examples, positioning information of a WTRU may be determined, e.g., based on measurements made on the PRS received from one or more measurement sources (e.g., TRPs, gNBs) and/or the assistance data containing information on the location of the measurement sources. The WTRU may calculate a WTRU location, e.g., by determining the distances from the different TRPs. In examples, a WTRU may determine the distances from the different TRPs based on a timing measurement associated with a PRS received from the TRPs. The distance from a measurement source (e.g., each measurement source) may be associated with a radius of a circle around the measurement source. If a WTRU may measure the distance from the measurement source (e.g., based on a PRS timing measurement), the WTRU may be located anywhere along the circumference around the measurement source. If multiple measurement sources are used (e.g., where different circles or circumferences and distances or radii may be associated with the different measurement sources), the location of the WTRU may be determined, e.g., based on the intersection of the circles or circumferences. In examples, position in a GNSS system may be determined, e.g., based on the reception of GNSS signals from multiple GNSS satellites.

A tolerance value (e.g., +margin/bound) may be associated with a measurement source (e.g., each measurement source) and a calculated distance or radius from the measurement source, e.g., due to possible errors in the positioning related measurements (e.g., timing errors when measuring a PRS). In examples, a WTRU making a measurement of a DL-PRS transmitted from a TRP may be associated with a measurement tolerance value or an error bound/margin (e.g., max/min values) associated with the timing measurements made on a PRS received from the TRP and corresponding calculated distance from the TRP. An error bound may represent an uncertainty in the measurement of the distance determined between the TRP and the WTRU. The WTRU may receive information related to the standard deviations in the measurements or quality of measurements from the network, e.g., for the WTRU to compute the error bound. An error bound may be a combination of standard deviations of measurements or estimation errors of elements used to compute the position.

In examples, if the location of a WTRU is determined based on an intersection of radii of distances from different positioning sources (e.g., TRPs, gNBs that transmit/receive a PRS), total variance of a distance (e.g., distance error) may be determined as: where may be the uncertainty at a TRP as a function of time or bias (e.g., obtained from statistics and/or manufacturer specification), may be the uncertainty in a transmission path and an environment (e.g., multipath), e.g., obtained from statistical data, may be the uncertainty at a WTRU (e.g., due to receiver noise), e.g., obtained from statistical data, and may be modeled as a Gaussian distribution.

If measurements (e.g., multiple measurements) are made from different positioning sources for determining WTRU location information, the error bounds or margins associated with a measured distance or radius (e.g., each measured distance or radius), may be combined, e.g., for determining the overall uncertainty in the WTRU positioning information. The overall uncertainty may correspond to a spatial uncertainty region, e.g., within which the true location of the WTRU may be found. In examples, if at least three (3) measurements corresponding to DL-PRS transmissions from three (3) different TRPs are made by the WTRU, the uncertainty in location information may be modeled as an uncertainty region in three (3) spatial dimensions (e.g., longitude, latitude, altitude), e.g., within which the WTRU may be located. The size or dimensions of the uncertainty region may change dynamically, e.g., as a result of a combination of one or more factors (e.g., WTRU mobility, multipath, interference, change in the error bounds, change in error sources).

Integrity thresholds (e.g., requirements) may be provided. In WTRU-based and/or LMF-based integrity, a WTRU or network may determine whether integrity is fulfilled, e.g., by comparing the calculated or estimated positioning information and integrity metrics with respect to integrity thresholds (e.g., requirements) or integrity KPIs. The integrity thresholds (e.g., requirements) or integrity KPIs may be defined in terms of values (e.g., threshold values) in terms of one or more of an AL, a PL, or a TTA.

Integrity may be fulfilled, for example, if one or more instances of a determined WTRU positioning information or location information is less than or equal to one or more thresholds defined by the AL. The thresholds defined by AL may be associated with at least one spatial dimension (e.g., vertical, horizontal). Integrity may be fulfilled, for example, if one or more instances of a determined WTRU positioning information or location information is less than or equal to a threshold defined by the PL. The thresholds defined by PL may be associated with at least one spatial dimension (e.g., vertical, horizontal). Integrity may be fulfilled, for example, if an alert message is generated and triggered within a time duration (e.g., if a determined WTRU positioning information or location information is greater than a threshold defined by an AL and/or a PL).

In examples, integrity may be inversely related to an uncertainty in the positioning information or location information of the WTRU. A high degree of uncertainty or large value of the error bound in the location information (e.g., positioning information is greater than a PL threshold) may correspond to a low integrity. A low degree of uncertainty or low value of the error bound (e.g., positioning information is below a PL threshold) in the location of information may correspond to a high integrity. Integrity requirements and uncertainty requirements may be inversely related. Integrity requirements and uncertainty requirements may be used interchangeably, e.g., if describing the ability to support positioning integrity.

Error sources which may impact the calculation or estimation of positioning integrity may include one or more of error sources to RAT-dependent positioning or error sources for RAT-independent positioning (e.g., GNSS-based). Error sources for RAT-dependent positioning may be for timing-based positioning (e.g., DL-TDoA, UL-TDoA) or angle-based positioning (e.g., DL-AoD, UL-AoA).

Error sources for timing-based positioning (e.g., DL-TDoA, UL-TDoA) may include a timing measurement error (e.g., ToA measurement error, reporting delay), a WTRU clock drifting within and across PRS occasions, a reference station or TRP synchronization (e.g., a real time difference (RTD) error, an RTD drift), a radio environment (e.g., non-line-of-sight (NLOS) delay bias, a multipath, an SNR and/or an RSRP of a PRS, interference, WTRU velocity, Doppler effect), a measurement geometry (e.g., a geometric dilution of precision (GDOP) or a dilution of precision (DOP) of TRPs or gNBs), a cell data base accuracy (e.g., TRP coordinates, antenna height), an uncertainty or quality of measurements (e.g., an uncertainty in line-of-sight (LoS) or NLOS detection, a PRS, an RSRP, a PRS SINR), a frequency of measurement feedback between a WTRU and a network (NW)), and/or non-positioning error sources (e.g., radio link failures, handover failures, poor coverage).

Error sources for angle-based positioning (e.g., DL-AoD, UL-AoA) may include an angle measurement error, faults during beam sweep and spatial relation assessment, gNB antenna calibration (e.g., phase distortion among antenna elements, conformity of an antenna radiation pattern), a radio environment (e.g., an NLOS angle spread, multipath reflections, interference, WTRU velocity, Doppler effect), a measurement geometry, a cell data base accuracy, and/or a frequency of measurement feedback between a WTRU and a NW.

Error sources for RAT-independent positioning (e.g., GNSS-based) may include a satellite clock error, an ionospheric error, a tropospheric delay, a satellite ephemeris error, a multipath error, a receiver noise, and/or a satellite geometry (e.g., a GDOP).

In examples, the error sources may be associated with a positioning scheme or positioning configuration, e.g., where a positioning configuration may be impacted by one or more error sources. Certain error sources may be common to (e.g., shared between) multiple positioning schemes or positioning configurations. Certain error sources may be specific to a positioning scheme or positioning configuration. In examples, the error sources may be independent of the positioning scheme or positioning configuration.

Error events may be associated with error sources. Error events may be triggered and/or caused by one or more error sources (e.g., a combination of error sources). The error events may include error events in assistance data, error events encountered during data transmission between a network (e.g., an LMF and/or an RAN) and a WTRU, error events related to a RAT-Independent (e.g., GNSS-based) positioning system, error events in a WTRU, and/or error events in an LMF (e.g., hardware and/or software faults). In examples, error events in assistance data may be an incorrect computation by a positioning service provider (e.g., including corrupt and/or lose data related to positioning) or (e.g., external) error events impacting a positioning service provider (e.g., including system-station outages). In examples, error events encountered during a data transmission between a network and a WTRU may include faults in data integrity, e.g., where data includes WTRU capability data, assistance data, positioning/integrity measurement data, and/or calculated positioning/integrity data. Error events related to a RAT-Independent positioning system may include satellite error events, atmospheric error events, and/or local environment error events (e.g., multipath, spoofing, interference). In examples, error events in a WTRU may include being out of sync with a network or GNSS, being out of coverage, failure to receive assistant data, failure to support a TIR (e.g., TIR not available for calculation), and/or hardware and/or software faults.

Supporting positioning integrity may be provided, e.g., using multiple positioning schemes based on a switching pattern. A WTRU may use multiple configured positioning schemes, e.g., for determining positioning integrity. In examples, a WTRU may use a first positioning scheme (e.g., primary positioning scheme) and a second positioning scheme (e.g., secondary positioning scheme), e.g., based on a switching pattern for achieving or ensuring positioning integrity. The first and second positioning schemes may represent a subset of schemes (e.g., at least two schemes) from a set of positioning schemes (e.g., multiple positioning schemes) configured in the WTRU. A positioning scheme (e.g., configuration) may be designated as the primary or first or reference scheme (e.g., configuration). A positioning scheme (e.g., any other positioning scheme/configuration) may be an alternative or second or secondary positioning scheme (e.g., configuration). Using positioning schemes (e.g., multiple positioning schemes) with a switching pattern for switching between the different positioning schemes may be used for WTRU-based integrity (e.g., a mobile originated location request (MO-LR) and a mobile terminated location request (MT-LR)) and LMF-based integrity (e.g., MO-LR and MT-LR).

In examples, the first and second positioning schemes and the associated switching pattern may be configured in a WTRU (e.g., received in configuration information), e.g., based on the WTRU capability information. If configured with multiple positioning configurations, a WTRU may determine whether a degree of uncertainty or integrity requirements are satisfied, e.g., by comparing the positioning information determined using a positioning scheme (e.g., a secondary positioning scheme/configuration or a second positioning scheme/configuration) with respect to the positioning information determined using a different positioning scheme (e.g., a primary positioning scheme/configuration or a first positioning scheme/configuration). The calculation for integrity may be determined based on the comparison as a function of the positioning information, e.g., if a WTRU is configured with multiple positioning schemes (e.g., configurations). The function of the positioning information may be determined using the first and second positioning schemes (e.g., a difference between the first and second positioning information).

For ensuring integrity, the multiple alternative/candidate positioning schemes (e.g., configurations) configured in the WTRU (e.g., received in configuration information) may be selected, e.g., such that the location information of the WTRU is determined independently (e.g., using different PRS/TRP configuration). The error sources or error events impacting positioning schemes (e.g., configurations) may be different and independent.

A WTRU may use different positioning schemes (e.g., independent positioning schemes/configurations) for determining the degree of uncertainty or integrity in the estimated or calculated WTRU location, e.g., by switching or alternating between the schemes (e.g., configurations) or using the positioning schemes (e.g., configurations) concurrently. In examples, alternative positioning schemes or positioning schemes (e.g., configurations) that may be configured for integrity may be any of the following: RAT-dependent (e.g., DL PRS, an enhanced cell ID (ECID), a sidelink) and RAT-independent (e.g., GNSS, WiFi, Bluetooth), DL-based (e.g., DL-PRS) and UL-based (e.g., UL-SRSp), multiple DL-based (e.g., DL-TDoA and DL-AoD) or UL-based (e.g., UL-TDoA and UL-AoA), or multiple WTRU-based (e.g., a first DL-PRS scheme/configuration and a second DL-PRS scheme/configuration) or LMF-based (e.g., a first UL-SRSp scheme/configuration and second UL-SRSp scheme/configuration).

A WTRU may be configured with parameters for supporting integrity, e.g., which may include one or more integrity KPIs or integrity thresholds (e.g., requirements). The WTRU may receive assistance information from a network on error sources and error events.

Integrity thresholds (e.g., requirements) and/or information on error sources or error events may be specific to a positioning configuration or positioning scheme or applicable for a combined set of positioning configurations or positioning schemes. In examples, a WTRU may be configured with a set of one or more integrity thresholds (e.g., requirements, such as, PL, AL). The set of one or more integrity thresholds (e.g., requirements) may be applicable, for example, if using a first and second positioning scheme individually to determine integrity. The set of one or more integrity thresholds (e.g., requirements) may be applicable if using a first and second positioning scheme jointly to determine integrity. In examples, integrity KPIs or integrity thresholds (e.g., requirements) may be applicable over a time duration (e.g., a certain time duration) if the multiple positioning configurations or positioning schemes are applied. In examples, a first set of integrity thresholds (e.g., requirements) may be applicable over a first time-duration and a second set of integrity thresholds (e.g., requirements) may be applicable over a second time-duration, for example, if using first and second positioning schemes in different configurations over the first and second time-durations.

In examples, first and second positioning schemes may be used for performing cross comparison of WTRU positioning information (e.g., positioning measurements and/or location information). The positioning information determined using the first scheme may be compared with respect to the positioning information determined with the second scheme and vice versa, e.g., for ensuring integrity. In examples, the first and second positioning schemes and the associated switching pattern may be used for statistically spreading out potential error events or error sources over different dimensions. The error events or error sources may be distributed over a temporal dimension, e.g., if the switching is performed over a time duration and/or spatial dimension if the switching is performed over different time durations and/or across different TRPs/gNBs respectively. If a positioning scheme experiences a failure condition (e.g., where one or more errors exceed an integrity threshold), an alternative positioning scheme (e.g., second positioning scheme) may be used as a first positioning scheme (e.g., primary positioning scheme) for the duration of recovery from the failure condition.

The WTRU may send capability information for positioning integrity. In examples, the WTRU may send capability information to network (e.g., an LMF and/or a gNB) on supporting one or more positioning schemes/configurations. The capability information sent by the WTRU may be associated with supporting positioning integrity using different positioning operations. The capability information sent by the WTRU may include one or more of the following: types of positioning operations supported, a number of positioning operations supported, a bandwidth (e.g., that can be utilized for positioning), a time duration for measurements, support for different positioning modes, and/or support for positioning integrity.

The capability information sent by the WTRU may include types of positioning operations supported. Types of positioning operations supported may include, for example, RAT-independent positioning operations (e.g. based on GNSS, WLAN, Bluetooth), RAT-dependent positioning operations (e.g. DL-TDoA, UL-TDoA, DL-AOD, UL-AoA) and/or a hybrid/combination of RAT-dependent and RAT-independent positioning operations The capability information sent by the WTRU may include a number of positioning operations supported. For example, the WTRU may indicate the number and/or types of positioning operations that can be supported simultaneously and/or in a staggered manner (e.g., positioning operations occurring one after another at different time instances/time slots/time durations). The WTRU may include its capability for supporting (e.g., multiple) positioning operations for positioning integrity, for example.

The capability information sent by the WTRU may include a bandwidth that can be utilized for positioning. For example, the WTRU may indicate the frequency carriers and/or the bandwidth (e.g. maximum amount, contiguous amount, non-contiguous amount) that can be utilized if/when performing DL measurements (e.g. PRS measurements) and/or UL transmissions (e.g. SRSp transmissions).

The capability information sent by the WTRU may include a time duration for measurements. For example, the WTRU may indicate the (e.g., expected) amount of time for performing measurements of DL-PRS (e.g., possibly over a given set of time-frequency resources in a PRS configuration). The WTRU may indicate the amount of time for processing the measurements and/or for generation of a measurement report (e.g., possibly if/when using different positioning operations).

The capability information sent by the WTRU may include support for different positioning modes. For example, the WTRU may indicate the support for WTRU-assisted mode and/or WTRU-based mode. The WTRU may also indicate the positioning reports that may be generated, which may include the information contained in the reports, for example.

The capability information sent by the WTRU may include support for positioning integrity. For example, the WTRU may indicate the support for (e.g., different) positioning integrity modes/types, which may include a WTRU-assisted mode and a WTRU-based mode (e.g., for different GNSS, RAT-dependent and hybrid operations). The WTRU may indicate information on the types of positioning integrity calculations supported (e.g. integrity algorithms), types of error sources that can be supported, types of error events/integrity events (e.g., detection of multipath, detection of NLOS condition, detection of GDOP condition, detection of low RSRP when performing measurements on PRS) that can be detected, types of representations associated with error sources/error events that the WTRU may support if/when receiving assistance information (e.g., state-space representation, observation-space representations), and/or types integrity reports generated and contents of reports (e.g., calculated PL, TIR, TTA).

The WTRU may send the capability information to a network (e.g., via LPP signaling such as via LPP request capabilities, LPP provide capabilities messages) using an LPP capabilities transfer procedure, for example, based on receiving a request for capabilities from network or based on receiving a triggering indication (e.g. MO-LR, MT-LT, deferred MT-LR) for providing capabilities. In examples, the WTRU may send the capability information to the network (e.g., gNB) in message(s) (e.g., access-stratum layer messages including RRC signaling, MAC CE signaling, and/or UCI).

A WTRU may determine integrity with multiple positioning schemes which may have overlap (e.g., a certain degree of overlap). In examples, the WTRU may use a first and second positioning scheme with a switching pattern, e.g., that allows a certain degree of overlap between the positioning schemes. The overlap between the positioning schemes may ensure that a WTRU achieves a certain degree of diversity, e.g., if the WTRU determines the positioning measurements or location information and integrity. In examples, the first and second positioning schemes may use one or more TRPs or gNBs that may be common or associated with the first and second positioning schemes. The first and second positioning schemes may be associated with one or more TRPs or gNBs that may be non-overlapping or unshared between the scheme. If an overlapping switching pattern is applied or configured in the WTRU, a time duration (e.g., a first time duration) within the switching pattern may include using a positioning scheme with a first set of TRPs or gNBs (e.g., for a first positioning scheme) and a second time duration may include using a second set of TRPs or gNBs (e.g., for a second positioning scheme), where both the first and second set of TRPs or gNBs may include a TRP or gNB (at least one TRP or gNB), which may be used in both time durations. A WTRU may be configured with different PRS configurations associated with the first and second positioning schemes, e.g., to be used with the switching pattern.

In examples, a WTRU may use a first and second positioning scheme within a switching pattern that allows both schemes to be used (e.g., used simultaneously). If both schemes are used simultaneously, the WTRU may use different radio or RF interfaces (e.g., at least two different radio or RF interfaces) for using the first and second positioning schemes (e.g., receiving PRS or transmitting SRSp) simultaneously for ensuring integrity.

Figure 2:
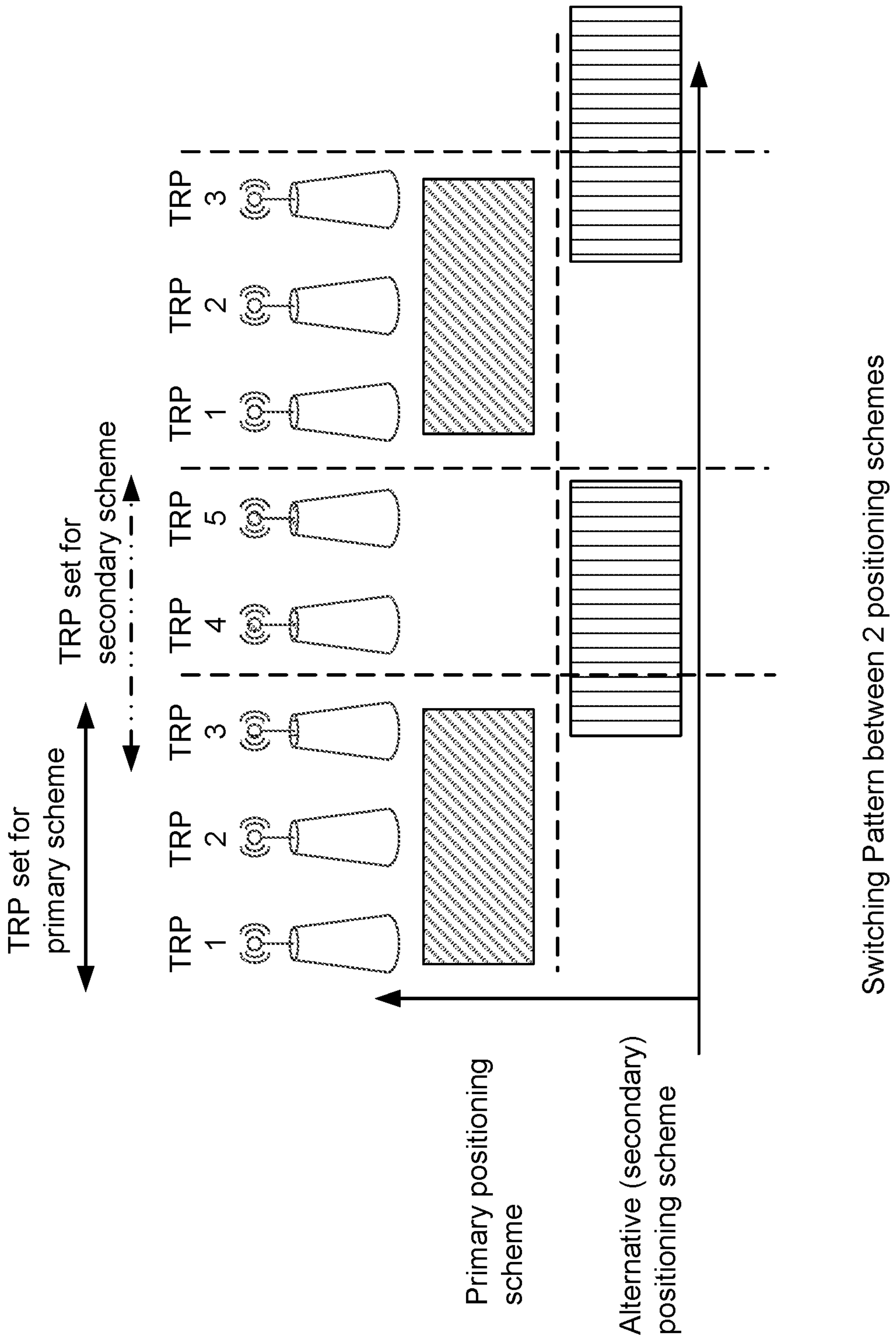
FIG. 2 is a diagram illustrating an example switching pattern between two positioning schemes

A WTRU configured with a switching pattern may be used with multiple positioning schemes for integrity. FIG. 2 illustrates a WTRU using a switching pattern for switching between two positioning schemes comprising multiple switching/transitioning points where the WTRU switches from using a primary positioning scheme to an alternative positioning scheme (e.g., secondary positioning scheme).

In examples, a WTRU configured with multiple positioning schemes for integrity may be configured with a switching pattern or rule (e.g., at least one switching pattern or rule) to be used with the corresponding positioning schemes. A switching pattern (e.g., for switching between at least two or more positioning schemes) may include one or more switching/transitioning points, e.g., where the WTRU switches from using a first positioning scheme to a second positioning scheme (e.g., as shown in FIG. 2). In examples, a first positioning scheme may be used up to a first switching point followed by a second positioning scheme up to a second switching point. In examples, if a primary positioning scheme and a secondary positioning scheme are available for use, a WTRU may use (e.g., use as a default) the primary positioning scheme up to a first switching point followed by a secondary positioning scheme up to a second switching point. The granularities associated with the different positioning schemes at which the switching points may be configured to recur within a switching pattern may include one or more of the following combinations: time durations with an equal or different lengths between the switching points, frequency or bandwidth with an equal or different lengths between the switching points, a resource set with an equal or different number of resources per set between the switching points, and/or TRPs or gNBs with an equal or different number between switching points.

In examples, the WTRU may determine positioning information (e.g., positioning measurements, location information) using a positioning scheme if the WTRU performs a set of measurements (e.g., at least one set of measurements) up to a switching point, followed by the use of another positioning scheme for another set of measurements. The WTRU may determine the positioning information, for example, if the WTRU performs measurements (e.g., multiple recurring measurements) over multiple switching points. The WTRU may determine positioning integrity using multiple positioning schemes, for example, if the WTRU performs measurements using at least two positioning schemes with an associated switching point (e.g., at least one associated switching point).

The WTRU may be configured with a switching pattern by a network (e.g., an LMF and/or an RAN), e.g., for supporting integrity with one or more positioning schemes. In examples, the WTRU may receive the switching pattern as a part of the integrity configuration (e.g., at least in part of the integrity configuration), which may include the integrity KPIs or integrity requirements and information on error sources or error events. The WTRU may determine a switching pattern autonomously, e.g., based on integrity KPIs or integrity thresholds (e.g., requirements), which may be received from a network or signaling (e.g., signaling via higher layers).

A WTRU may be configured (e.g., preconfigured) with a second or alternative switching pattern (e.g., in addition to a first or default switching pattern), e.g., where the second switching pattern may be used over a certain duration or phase (e.g., based on triggering conditions). In examples, if a failure condition and/or an error event is detected by the WTRU or indicated by the network, the WTRU may transition to use a second switching pattern until the recovery from the failure condition is detected or indicated. If a WTRU transitions to use a second switching pattern until the recovery from the failure condition is detected or indicated, the second switching pattern may be configured with a longer duration or biased towards using a positioning scheme which is less error prone and more reliable. A WTRU may transition to using the first switching pattern for integrity, e.g., if there is recovery.

In an example, a switching pattern (e.g., which may be configured and/or used by the WTRU), may be intended for maximizing the diversity and redundancy between the different positioning schemes, e.g., such that the WTRU may determine positioning information (e.g., positioning measurements, location information) independently if using different positioning schemes and integrity configurations.

A WTRU may be configured to send an integrity report, e.g., if using multiple positioning schemes. A WTRU may be configured with an integrity reporting configuration, e.g., for sending the integrity report comprising positioning information and/or integrity measurements/results (e.g., PL) to a network (e.g., an LMF or an RAN). The WTRU may use the integrity reporting configuration, e.g., for sending the integrity result periodically and/or aligned or corresponding with the switching pattern.

In examples, the WTRU may send the integrity report if the WTRU uses each of the different positioning schemes in a switching pattern. If the WTRU uses each of the different positioning schemes in a switching pattern, the WTRU may send a first integrity report after using a first positioning scheme (e.g., prior to switching to a second positioning scheme). The WTRU may send a second integrity report after using a second positioning scheme, e.g., where the second integrity report may contain either a full integrity result (e.g., a combined integrity result using first and second schemes) or a delta result (e.g., a difference or increment with respect to the first report. In examples, the WTRU may send the integrity report if the WTRU completes a cycle of a switching pattern (e.g., at least one cycle of a switching pattern).

The WTRU may send an integrity report, for example, based on integrity reporting configuration information. The WTRU may include one or more of the following information if/when sending the integrity report to the network: positioning operations/configurations applied if/when supporting positioning integrity; a calculated/determined integrity result; an integrity indication(s)/flag(s); information associated with a switching pattern; measurements used for determining/calculating integrity results; information related to error events/integrity events/error sources; and/or information on whether a recovery operation/configuration is applied. The types of information to be included in the integrity report may be received by the WTRU in the integrity reporting configuration information, for example.

The WTRU may include (e.g., if/when sending the integrity report to the network) information associated with positioning operations/configurations applied if/when supporting positioning integrity. For example, the WTRU may include in the report the information on types of positioning operations (e.g., IDs of operations), a number of operations, positioning integrity modes (e.g. single/multiple positioning operations), a time duration/bandwidth for using the different positioning operations, etc.

The WTRU may include (e.g., if/when sending the integrity report to the network) information associated with a calculated/determined integrity result. For example, a calculated/determined integrity result may include a PL value, a TIR value, a TTA value, an achieved AL value, and/or a difference between achieved AL and received AL. The WTRU may send reports on the uncertainty of the calculated positioning result (e.g., standard deviation, variance values), for example. The WTRU may send reports on the status of positioning uncertainty (e.g., calculated uncertainty) associated with the different PRS configurations and/or GNSS operations configured/supported by the WTRU.

The WTRU may include (e.g., if/when sending the integrity report to the network) information associated with integrity indications/flags. For example, the WTRU may send reports indicating whether the determined positioning integrity satisfies one or more integrity KPIs/threshold/requirements (e.g., TIR, AL, TTA). In this case, the WTRU may send an indication/flag indicating a binary value, for example, if/when meeting a configured integrity KPI/threshold/requirement (e.g., if/when the determined integrity/uncertainty is above/below an AL threshold). For example, the WTRU may send in the integrity report, the difference between the determined/calculated integrity result (e.g., positioning uncertainty) and the integrity KPI/threshold/requirement. For example, the WTRU may send in the report a flag on whether an integrity event has occurred, for example, including if/when detecting an error source/error event and/or if/when the determined integrity result is above/below a configured integrity threshold value (e.g., AL, TIR).

The WTRU may include (e.g., if/when sending the integrity report to the network) information associated with information on a switching pattern. For example, the WTRU may indicate the identifier/ID of the switching pattern applied (e.g., when switching pattern is configured by the network) and/or information on the parameters used in the determined switching pattern (e.g., including the total time duration, switching points/instance when switching between different positioning methods/schemes/configurations, etc.), for example if/when switching pattern is determined/derived by the WTRU.

The WTRU may include (e.g., if/when sending the integrity report to the network) information associated with measurements used for determining/calculating integrity results (e.g., RSRP of PRS used for measurements).

The WTRU may include (e.g., if/when sending the integrity report to the network) information associated with information related to error events/integrity events/error sources. For example, the WTRU may send reports on measurements made on error sources associated with different TRPs/gNBs and/or PRS/SRSp configurations. For example, the WTRU may send reports on the WTRU's local environment, for example, including detection of NLOS, number of multipaths, etc. The WTRU may report on detection and/or measurements of signal interference, jamming, spoofing, etc., for example.

The WTRU may include (e.g., if/when sending the integrity report to the network) information associated with information on whether a recovery operation/configuration is applied. For example, if/when the WTRU is configured with a recovery configuration/operation and/or if/when the WTRU determines/updates a recovery configuration, the WTRU may send in the report information on the applied recovery configuration (e.g., ID of recovery configuration, time when recovery configuration is triggered, duration in which recovery configuration is activated, time when recovery configuration is deactivated). The WTRU may include in the report the measurements and/or calculated integrity result determined, for example, if/when using a recovery configuration.

A WTRU may determine a switching pattern for integrity to use with multiple positioning schemes. In examples, a WTRU may determine or derive a switching pattern for integrity, e.g., based on a positioning configuration and integrity configuration. If a WTRU determines or derives the switching pattern for integrity based on the positioning and integrity configuration, the WTRU may use the positioning and/or integrity configurations received from a network (e.g., an RAN or an LMF) and/or higher layers as guidelines or constraints if determining the switching points in a switching pattern to switch from one positioning scheme to another.

Positioning configuration information, which may be configured (e.g., preconfigured) in the WTRU, may include one or more of the following: schemes (e.g., configurations) associated with one or more positioning schemes (e.g., DL-PRS, UL-SRSp), and/or QoS thresholds (e.g., requirements) or KPIs associated with one or more of the configured positioning schemes. In examples, configuration information associated with one or more positioning schemes may include assistance information (e.g., indicating the set of TRPs or gNBs (e.g. ID) from which the WTRU may receive the PRS or transmit an SRSp), the time or frequency resources that carry the PRS, and/or timing information of the PRS reception (e.g., a start time, a periodicity, a maximum time duration). QoS thresholds (e.g., requirements) or KPIs associated with one or more of the configured positioning schemes may include the following (e.g., at least one of the following): a latency threshold (e.g., requirement, such as, latency for PRS measurements and reporting of positioning information, such as PRS measurements and/or location information, for example), a positioning accuracy, a WTRU power efficiency, and/or a resource usage efficiency.

The determined or derived switching pattern with the different positioning schemes may result in realizing different tradeoffs (e.g., in terms of latency, accuracy, and/or diversity), for example, if enforcing integrity. In examples, if a first positioning scheme used is DL-TDoA, the use of DL-AoD as a second positioning scheme may result in a shorter latency (e.g., compared to using UL-SRSp as a second scheme). The diversity achieved with DL-AoD may be lower than that achieved using UL-SRSp, e.g., due to a possibility of being impacted by similar error sources.

The WTRU may determine a switching pattern comprising the use of a first positioning scheme for a duration, for example, until the positioning accuracy requirement may be met (e.g., RSRP measurements for a PRS are above threshold and stable). A second positioning scheme may be used at a switching point (e.g., following the first positioning scheme), e.g., where the second positioning scheme may be used for a certain duration until the associated positioning accuracy requirement is met. Both the durations used for the first and second positioning schemes within the switching pattern may be determined by a WTRU to be within a latency threshold (e.g., maximum latency) for determining integrity, e.g., if the WTRU determines a switching pattern using the first positioning scheme and second positioning scheme for a certain duration until the positioning accuracy thresholds (e.g., requirements) are met.

A WTRU may switch (e.g., dynamically switch) to a positioning scheme (e.g., different positioning scheme) if the WTRU detects a switching condition. In examples, the WTRU may switch (e.g., dynamically switch) from a first positioning scheme to a second positioning scheme if detecting a switching condition. The first and second positioning scheme may be configured (e.g., preconfigured) in the WTRU with one or more switching conditions (e.g., included in configuration information, for example, received by the WTRU). If the first and second positioning scheme is configured (e.g., preconfigured) in the WTRU with one or more switching conditions, the switching points may be determined (e.g., dynamically determined) by a WTRU, e.g., based on at least one of the following triggers: a detection of an error source or error event (e.g., at least one error source or error event) in a positioning scheme, a detection of a GDOP condition, an integrity calculation trigger (e.g., PL and/or AL thresholds), and/or an expiration of a duration of time (e.g., via a configured timer). In examples, the WTRU may switch to a second positioning scheme if an error source (e.g., a TRP fault, multipath, changes in a WTRU radio environment) is detected in a first positioning scheme. In examples, a WTRU may change at least one of the positioning sources (e.g., TRPs or gNBs) within a first positioning scheme to a new TRP or gNB in a second positioning scheme, e.g., if the existing set of positioning sources are determined to be located close to each other (e.g., within a threshold angle) from the WTRU location (e.g., due to WTRU mobility, multipath). In examples, a WTRU may switch to a second positioning scheme, e.g., if an integrity (e.g., determined using a first positioning scheme) exceeds a threshold value. In examples, a WTRU may switch to a second positioning scheme, e.g., if a duration (e.g., via a configured timer) associated with a first positioning scheme expires. For example, a duration may be measured in seconds, microseconds, counts of a system frame number, and the like.

A WTRU may determine positioning sources to be included or excluded into positioning schemes, e.g., for integrity. A WTRU may determine a possibility for using a second positioning scheme with a first positioning scheme, e.g., based on the detection and/or validation of one or more positioning source (e.g., TRPs or gNBs). In examples, a WTRU may detect a transmission of reference signals (e.g. a PRS or a radio resource management (RRM)), e.g., from a new positioning source due to WTRU mobility or clearance of a blockage condition. The WTRU may indicate (e.g., to an LMF or an RAN) the detection of the positioning source. The WTRU may include a request for validating the detected positioning source to be used in a first and/or second positioning scheme. The WTRU may indicate (e.g., to an LMF or an RAN) the initial or achievable integrity result, e.g., if using the new positioning sources in a first or second positioning scheme, for example, based on initial measurements and/or an estimated integrity calculation.

A WTRU may be assisted by a network, e.g., in validating a new positioning source prior to providing the positioning configuration and the associated integrity configuration in assistance information. In examples, the LMF or RAN may turn off or mute a transmission (e.g., a PRS transmission) from a first set of TRPs associated with a first positioning scheme, e.g., so that the WTRU may perform measurements from the one or more positioning sources (e.g., new positioning sources) using a second positioning scheme during a validation phase. The WTRU may send the measurement report comprising the measurements made e.g., using the positioning sources and/or information on integrity (e.g., new positioning sources and/or information on integrity) achievable to the network. If validation is successful, the WTRU may receive the configuration information associated with a second positioning scheme (e.g., new or updated second positioning scheme) containing the associated (e.g., new) positioning sources.

If error events or error sources associated with one or more positioning sources associated with existing positioning schemes are detected, the WTRU may flag and/or indicate to the network an exclusion of the positioning source, e.g., if determining integrity. The WTRU may be assisted by the network (e.g., an LMF or an RAN) for isolating the error source (e.g., identified error source) during a validation phase. The WTRU may receive positioning configuration information or positioning scheme information (e.g., new or updated positioning configuration information or positioning scheme information) in assistance information, e.g., if an error source is removed.

Figure 3:
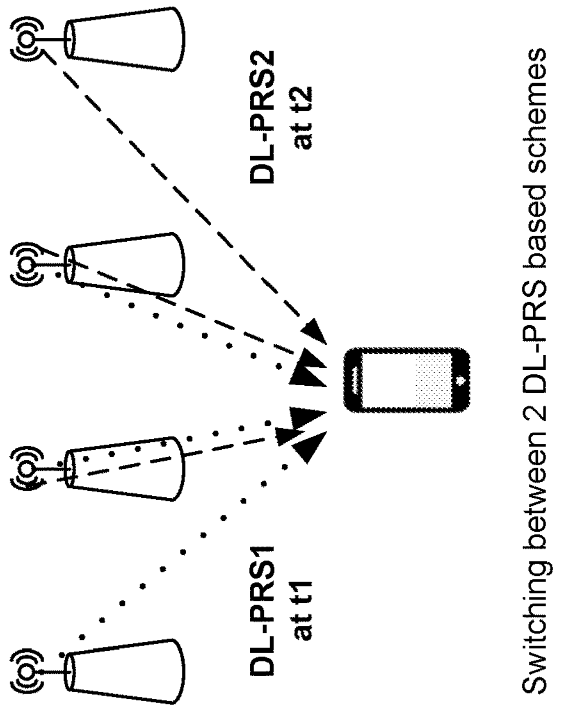
FIG. 3 is a diagram illustrating an example switching pattern between two DL-PRS based schemes.

A WTRU may ensure integrity, e.g., using multiple DL-based positioning schemes. FIG. 3 illustrates a WTRU making PRS measurements from a first set of TRPs in a time duration t1 (e.g., using a DL-PRS1 configuration) and a second set of TRPs in a time duration t2 (e.g., using a DL-PRS2 configuration).

A WTRU may be configured with one or more schemes/configurations (e.g., DL-PRS schemes/configurations) and may be configured with a switching pattern (e.g., to switch between a first and a second PRS schemes/configuration) to ensure integrity with DL-based positioning operations or schemes. The PRS schemes (e.g., different PRS schemes/configurations) configured in a WTRU may be associated with a set comprising one or more TRPs or gNBs (e.g., with or without overlap between the PRS schemes/configurations), from which the WTRU may receive the DL-PRS, e.g., for positioning measurements. In examples (e.g., shown in FIG. 3), the WTRU may make PRS measurements from a first set of TRPs in a time duration t1 and a second set of TRPs in a time duration t2, where there may be overlapping TRPs (e.g., several overlapping TRPs) between the first set and second set.

A WTRU may be configured with measurement gaps (e.g., different measurement gaps) which may be aligned with a switching pattern, e.g., for making PRS measurements of PRS resources (e.g., different PRS resources). In examples, a measurement gap (e.g., first measurement gap) may be aligned or span over the time or frequency resources associated with the PRS scheme (e.g., first PRS scheme/configuration). A second measurement gap may be configured in the WTRU to be used upon switching, where the second measurement gap may be aligned to span over the time or frequency resources associated with the second PRS scheme (e.g., configuration).

An alignment between PRS schemes (e.g., configurations) and measurement gap schemes (e.g., different PRS schemes/configurations and measurement gap schemes/configurations) may be performed, e.g., based on a WTRU-based approach or a network-initiated approach. In examples, in a WTRU-initiated approach, the WTRU may receive the PRS configuration information associated with positioning schemes (e.g., first and second positioning schemes) with some switching pattern, e.g., from a network (e.g., an LMF and/or an RAN). The WTRU may send a request for configuring a measurement gap to the serving gNB (e.g., in RRC, MAC CE, or uplink control information (UCI)), e.g., such that the configured measurement gap is aligned with the switching pattern and spans over the first and second PRS schemes (e.g., configurations) over their respective time and/or frequency resources.

In examples, in a network-initiated approach, the LMF may determine the measurement gap scheme (e.g., configuration) for the WTRU, e.g., based on the information provided by the WTRU or service gNB on the bandwidth part (BWP) and/or resources allocated for the WTRU. In a network-initiated approach, the LMF may determine the measurement gap configuration that may align with the one or more PRS configurations and the switching pattern. The WTRU may receive the PRS configuration information and switching pattern along with the measurement gap configuration information from the network (e.g., an LMF and/or an RAN).

A WTRU may send an integrity report, which may include positioning information (e.g., a measurement report for WTRU-assisted positioning, location information for WTRU-based positioning) to a network (e.g., an LMF or an RAN) upon performing measurements (e.g., DL-PRS measurements) using positioning schemes (e.g., different positioning schemes). The integrity report may include information on an integrity result (e.g., a PL) and/or error sources or error events determined using the different positioning schemes (e.g., DL-based positioning schemes). In examples, the WTRU may send an integrity report based on completing a measurement (e.g., a DL-PRS measurement) if using a positioning scheme (e.g., after a switching point in a switching pattern). In examples, the WTRU may send the integrity report based on completing a cycle (e.g., at least one cycle) in a switching pattern, which may include one or more positioning schemes (e.g., DL-based positioning schemes).

Figure 4:
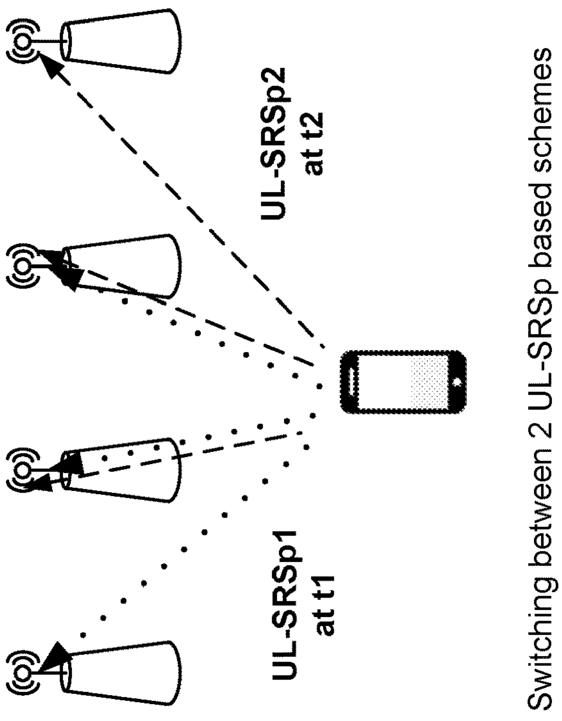
FIG. 4 is a diagram illustrating an example switching pattern between two UL-SRSp based schemes.

A WTRU may ensure integrity using multiple UL-based positioning schemes. FIG. 4 illustrates an example WTRU transmitting using a first SRSp scheme (e.g., configuration) for a first time duration (e.g., t1) and transmitting using a second SRSp scheme (e.g., configuration) for a second time duration (e.g., t2).

In examples, a WTRU may be configured with one or more UL-SRSp schemes (e.g., configurations) with a switching pattern, e.g., for ensuring integrity. In examples, the switching pattern configured in the WTRU may indicate transmitting using a first SRSp scheme (e.g., configuration) for a first time duration (e.g., t1). The switching pattern configured in the WTRU may indicate transmitting using a first SRSp scheme (e.g., configuration) for a first time duration until a switching point. The switching pattern configured in the WTRU may indicate transmitting using a first SRSp scheme (e.g., configuration) for a first time duration until a switching point followed by transmitting using a second SRSp scheme (e.g., configuration) for a second time duration (e.g., t2), as shown in FIG. 3. In this case, the first SRSp transmitted by WTRU may be received by a first set of TRPs and the second SRSp transmitted may be received by a second set of TRPs.

In examples, where a switching pattern (e.g., including switching points within the pattern) may be determined by a WTRU, the WTRU may use a first SRSp scheme (e.g., configuration) for transmission until a switching condition is met, followed by a second SRSp scheme (e.g., configuration) for transmission. In this case, the first and second SRSp conditions may be determined, e.g., by the WTRU (e.g., at least in part by the WTRU) based on one or more allowed SRSp schemes (e.g., SRSp schemes/configurations/preconfigurations). The WTRU may use one or more of the following combinations in determining the SRSp schemes (e.g., configurations): resource sets/bandwidth/carrier for an SRSp, a beam selection, and/or a Tx power level. A WTRU may use a first resource set or active BWP associated with the first SRSp scheme (e.g., configuration) and upon switching, a second resource set or BWP associated with a second SRSp scheme (e.g., configuration). A WTRU may use resources from a FR1 carrier for a first SRSp scheme (e.g., configuration) and resources from a FR2 carrier for a second SRSp scheme (e.g., configuration). A WTRU may use a first set of UL beams in transmitting to a set of TRPs or gNBs using a first SRSp scheme (e.g., configuration). A WTRU, upon switching, may use a second set of UL beams if transmitting to another set of TRPs/gNBs using a second SRSp scheme (e.g., configuration). A WTRU may use a first set of UL beams in transmitting to a set of TRPs or gNBs using a first SRSp scheme (e.g., configuration) and upon switching, may use a second set of UL beams if transmitting to another set of TRPs/gNBs using a second SRSp scheme (e.g., configuration). A WTRU may use a first Tx power level for a first SRSp scheme (e.g., configuration) and, based on switching, a second Tx power level for a second SRSp scheme (e.g., configuration).

Figure 5:
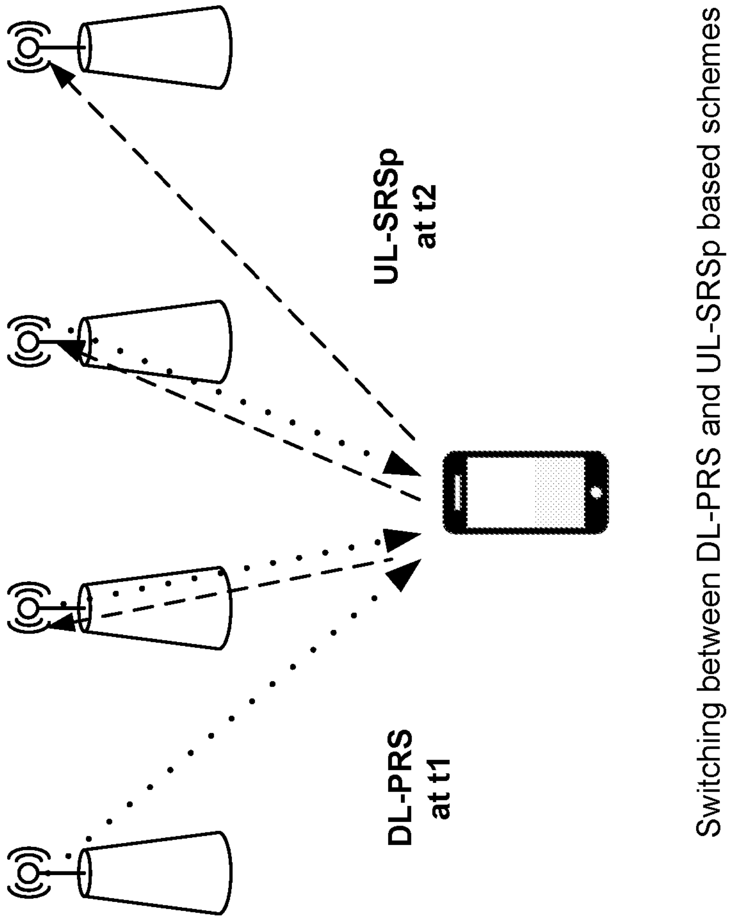
FIG. 5 is a diagram illustrating an example switching pattern between FL-PRS and UL-SRSp based schemes.

A WTRU may ensure integrity using a DL and UL-based positioning scheme. FIG. 5 illustrates a WTRU using a first positioning scheme (e.g., with a DL-PRS) from a set of TRPs over a first duration (e.g., t1) and following a switching point, the WTRU uses a second positioning scheme (e.g., with a UL-SRSp) over a second duration (e.g., t2).

In examples, the WTRU may be configured with one or more DL-based and UL-based positioning schemes (e.g., DL-PRS and UL-SRSp) to be used (e.g., used sequentially), e.g., based on a switching pattern for ensuring integrity. The use of DL-based and UL-based positioning schemes may include one or more combinations of different schemes (e.g., configurations) as described herein.

In examples, as shown in FIG. 5, the WTRU may be configured to use a first positioning scheme associated with a measurement of a DL-PRS from a set of TRPs over a first duration (e.g., t1). After a switching point, the WTRU may be configured to use a second positioning scheme for transmission of a UL-SRSp to a set of TRPs over a second duration (e.g., t2).

To ensure integrity, a WTRU may send an integrity report, which may include positioning information (e.g., a measurement report, location information) to a network (e.g., an LMF or an RAN) based on performing DL-PRS measurements. The integrity report may include information on the integrity result (e.g., a PL) and/or error sources or error events, e.g., determined using the first DL-based positioning scheme. In examples, the WTRU may send the integrity report with the UL-SRSp. In examples, the WTRU may send the integrity report based on completing a cycle (e.g., at least one cycle) of a switching pattern.

A WTRU may be configured with an integrity recovery scheme (e.g., configuration), e.g., to be applied during an integrity failure condition. In examples, a WTRU configured with a primary positioning scheme and secondary positioning scheme for ensuring integrity may transition to a recovery mode and use a configured integrity recovery scheme (e.g., configuration), e.g., based on the detection of at least one integrity error event associated with the configured positioning schemes. The WTRU may receive the integrity recovery configuration information from the network. The WTRU may receive the integrity recovery configuration information from the network, e.g., together or separately from the configuration information for primary and secondary positioning schemes for supporting integrity. The integrity recovery configuration information received by a WTRU may include one or more of alternative PRS configuration information associated with the primary and secondary positioning scheme (e.g., the alternative PRS configuration may include a different PRS measurement duration within a certain maximum measurement duration), a set of extended or alternative TRPs or gNBs per positioning scheme, and/or an alternative switching pattern to be applied during recovery mode.

The WTRU may use the integrity recovery configuration information associated with a primary and secondary schemes in recovery mode, e.g., if triggered by an error event (e.g., at least one error event) as described herein (e.g., measurements indicating an increase in positioning uncertainty). In examples, an integrity error event may be detected by a WTRU, e.g., based on fluctuations in PRS measurements received from a TRP associated with a primary or secondary scheme.

A WTRU may send an indication to an LMF. A WTRU may send an indication to an LMF, e.g., if the use of the integrity recovery scheme (e.g., configuration) is triggered at the WTRU. The WTRU may send reports to an LMF, e.g., indicating information on the detected error event which may include the measurements made on the error source (e.g., a TRP) associated with the error event. The indications and/or reports sent by the WTRU may include an identifier of error sources or TRPs impacted by errors and/or the duration applied for making PRS measurements on the TRPs impacted by errors. In examples, the WTRU may send the reports and/or measurements when a certain number of error sources associated with a positioning scheme are detected (e.g., TRPs with error are above a configured count, or all TRPs are erroneous), e.g., for minimizing the amount of reporting to an LMF. If the integrity recovery scheme (e.g., configuration) is triggered, the WTRU may continue to monitor the error event, e.g., by making measurements from the impacted positioning source (e.g., a TRP) and isolating the measurements from the integrity result. A WTRU may transition to using primary and secondary positioning schemes for ensuring integrity, e.g., upon mitigation of an error event (e.g., with network assistance).

The WTRU may isolate error sources, for example, if/when supporting positioning integrity. In examples, a WTRU configured for supporting positioning integrity (e.g., based on measurements made using one or more positioning operations/schemes/configurations) may isolate the measurements made from detected error sources/error events (e.g., associated with the positioning operations/configurations). The WTRU may isolate the measurements (e.g., which are detected to contain errors) made associated with a PRS received from one or more TRPs/gNBs associated with a DL positioning operation (e.g., DL-TDoA, DL-AoD), for example, if/when the WTRU reports the measurements to network and/or if/when the WTRU performs integrity calculations. In examples, the WTRU may isolate the one or more detected error sources while monitoring (e.g., continuing to monitor) and/or performing measurements associated with the error sources (e.g., where the measurements may be used, for example, for determining whether the resources/TRP/gNB/beam associated with the error sources may recover and/or reused for supporting positioning integrity). Information related to monitoring may be gathered by the WTRU and reporting of measurements related to the error sources may be performed by the WTRU, for example, if/when detecting the error sources.

The WTRU may (e.g., in this case) isolate the error sources based on one or more of the following: a type of the error sources; measurements associated with error sources; and/or a type of positioning operation.

The WTRU may isolate the error sources based on the type of the error sources. For example, the different error sources may include one or more of TRPs, gNBs, PRS configurations, different resources/resource sets within PRS schemes (e.g., configurations), different beams, and/or different frequency layers within PRS schemes (e.g., configurations).

The WTRU may isolate the error sources based on measurements associated with error sources. For example, the WTRU may isolate error sources if/when the measurements made (e.g. RSRP, number of multipaths) are above/below a threshold value.

The WTRU may isolate the error sources based on the type of positioning operations. For example, the number and associated/correlated error sources to be isolated may depend on the type of positioning operation applied. The WTRU (e.g., configured with a positioning method, for example, such as DI-TDoA) may isolate a first TRP/gNB if/when the first TRP/gNB is associated/correlated with a second TRP/gNB and an error source is detected in the second TRP/gNB.

The WTRU may be configured with one or more DL-TDoA positioning operations for supporting positioning integrity. In this case, the different DL-TDoA operations may use different PRS schemes (e.g., configurations), including one or more TRPs/gNBs which may be common across the different PRS schemes (e.g., configurations). For DL-TDoA operations, the positioning information may be determined, for example, based on time difference calculations between the PRS received from first TRP (e.g. reference TRP) and the PRS received from a second TRP. If/when the PRS received from the first or second TRP is detected to contain errors, the WTRU may isolate the measurements from (e.g., at least) both TRPs (e.g. pair of correlated TRPs), for example. In this case, any of the associated/correlated TRPs/gNBs (e.g., regardless of whether the error sources are directly detected) may be isolated by the WTRU for further monitoring and/or from integrity calculation, for example.

The WTRU may be configured with one or more DL-AoD positioning operations (e.g., with different PRS schemes/configurations) for supporting positioning integrity. In this case, if/when error sources are detected in one or more beams (e.g., received from the TRPs/gNBs associated with the PRS schemes/configurations) the WTRU may isolate the measurements made from the correlated beams (e.g. beams received from same or different TRP/gNBs, which may be impacted by same errors). The WTRU may refrain from isolating (e.g., need not isolate) the other beams for DI-AoD, for example, which may not be correlated with a beam detected to contain errors (e.g. based on RSRP measurements made on the PRS resources/beams).

The WTRU may use validity conditions, for example, if/when supporting positioning integrity. The WTRU may be configured with one or more validity conditions associated with a positioning integrity scheme (e.g., configuration), which may include at least one of the following: one or more positioning schemes/operations (e.g., PRS/SRSp schemes/configurations), integrity KPIs, error sources/error events, or integrity reporting modes (e.g., PL and/or integrity event flag). The WTRU may receive the validity conditions in one or more of LPP messages (e.g., LPP assistance data), positioning service request messages (e.g. MO-LR, MT-LR, deferred MT-LR), or other messages (e.g., access stratum (AS) layer messages, such as via RRC signaling, MAC CE signaling, or DCI), for example. The WTRU may receive the validity conditions, for example, if/when receiving the integrity configuration information.

The validity conditions received and/or configured in the WTRU (e.g., if/when supporting positioning integrity) may include one or more of the following: an area validity; a time validity; a positioning integrity/uncertainty validity; a mobility condition of the WTRU; a radio environment of the WTRU; error source(s) and/or error event(s); and/or an RRC state of the WTRU (e.g., CONNECTED, INACTIVE, IDLE, etc.).

The validity conditions received and/or configured in the WTRU (e.g., if/when supporting positioning integrity) may include an area validity. For example, the area validity may refer to the cell IDs, RAN notification area (RNA), and/or CN area in which the one or more integrity schemes (e.g., configurations) may be valid for usage. The WTRU may use a first set of integrity KPIs and/or reporting modes, for example, if/when the WTRU is in a first validity area (e.g., under coverage of a first set of cell IDs) and may use a second set of integrity KPIs and/or reporting modes, for example, if/when the WTRU is in a second validity area (e.g., under coverage of first set of cell IDs).

The validity conditions received and/or configured in the WTRU (e.g., if/when supporting positioning integrity) may include a time validity. For example, the time validity may be the time duration (e.g., a start time to an expiry time) in which the integrity schemes (e.g., configurations) may be valid for usage. The WTRU may begin tracking a duration of time (e.g., start a timer), for example, based on receiving an indication/trigger for supporting positioning integrity (e.g., in an LPP provide assistance data message, LPP location request message) and may use the PRS/SRSp schemes (e.g., configurations) along with associated integrity schemes (e.g., if the time (e.g., via the timer) is valid within the configured duration and/or not expired).

The validity conditions received and/or configured in the WTRU (e.g., if/when supporting positioning integrity) may include a positioning integrity/uncertainty validity. For example, the WTRU may use different integrity schemes (e.g., configurations) if/when detecting different validity conditions. The WTRU may use a first integrity scheme (e.g., configuration) (e.g., integrity KPIs and/or reporting modes), for example, if/when the determined integrity result is above/below a first positioning integrity/uncertainty threshold value. The WTRU may use a second integrity scheme (e.g., integrity KPIs and/or reporting modes), for example, if/when the determined integrity result is above/below a second positioning integrity/uncertainty threshold value. In this case, the PRS/SRSp schemes (e.g., configurations) used for PRS measurements/transmissions along with the integrity schemes (e.g., configurations) may be the same or different if/when detecting the different validity conditions.

The validity conditions received and/or configured in the WTRU (e.g., if/when supporting positioning integrity) may include a mobility condition of the WTRU. The WTRU may use the integrity schemes (e.g., configurations), for example, if/when the WTRU speed is below/above a (e.g., configured) speed threshold value associated with a validity condition. The WTRU may use an integrity scheme (e.g., configuration), for example, if/when the amount and/or rate of movement/orientation of the WTRU increases/decreases by a certain threshold value.

The validity conditions received and/or configured in the WTRU (e.g., if/when supporting positioning integrity) may include a radio environment of the WTRU. The WTRU may change from a first set of integrity schemes (e.g., configurations) to a second set, for example, if/when the RSRP of measurements made on PRS or non-positioning RS/channels (e.g., CSI-RS, SSB) associated with first set are above/below an RSRP threshold value. The WTRU may change from one set of integrity schemes (e.g., configurations) to another set, for example, if/when detecting that the number of multipaths are above/below a threshold and/or when NLOS conditions are detected.

The validity conditions received and/or configured in the WTRU (e.g., if/when supporting positioning integrity) may include error sources/error events. The WTRU may change from one set of PRS/SRSp schemes (e.g., configurations) and/or integrity configurations to another set, for example, if/when detecting one or more (e.g., new) error sources/error events and/or the measurements made on error sources (e.g. TRPs/gNBs) are above/below a threshold value, etc.

The validity conditions received and/or configured in the WTRU (e.g., if/when supporting positioning integrity) may include the RRC state of WTRU (e.g., CONNECTED, INACTIVE, IDLE). For example, the WTRU may change from using a set (e.g., consisting of one or more PRS/SRSp schemes/configurations and/or integrity schemes/configurations) to another, for example, if/when operating in different RRC states. The WTRU may use a first set of integrity schemes (e.g., configurations), for example, if/when operating in RRC CONNECTED state, a second set of integrity configurations, for example, if/when operating in RRC INACTIVE state, and a third set of integrity configurations, for example, if/when operating in RRC Idle state. In this case, the first, second and third sets associated with different RRC states may contain a subset of integrity schemes (e.g., integrity KPIs and/or reporting modes) which may be common across the sets (e.g., all sets) of the integrity schemes. The integrity schemes (e.g., configurations) may (e.g., alternatively) be mutually exclusive across the different sets associated with the different RRC states.

If the WTRU determines that one or more of the PRS/SRSp schemes (e.g., configurations) and/or integrity schemes (e.g., configurations) are found to be not valid (e.g., as per the validity conditions), the WTRU may perform one or more of the following: send an indication to the network; change to an alternative valid integrity scheme (e.g., configuration); and/or update/transfer conditions of the integrity scheme (e.g., configuration).

If the WTRU determines that one or more of the PRS/SRSp schemes (e.g., configurations) and/or integrity schemes (e.g., configurations) are found to be not valid (e.g., as per the validity conditions), the WTRU may send an indication to the network. For example, the WTRU may send an indication to network, indicating an identifier/ID of the integrity scheme (e.g., configuration) and/or the expiry status of the scheme (e.g., configuration). The WTRU may indicate to update the integrity scheme (e.g., configuration) or to update the validity conditions associated with the indicated integrity scheme (e.g., configuration). The indication to the network may be sent as an LPP message, on-demand PRS message (e.g., to an LMF or to a gNB), or another message (e.g., AS-layer message, for example, via RRC signaling, MAC CE signaling, or UCI), for example.

If the WTRU determines that one or more of the PRS/SRSp schemes (e.g., configurations) and/or integrity schemes (e.g., configurations) are found to be not valid (e.g., as per the validity conditions), the WTRU may change to an alternative valid integrity scheme (e.g., configuration). For example, the WTRU may use a second integrity scheme (e.g., which may be determined to satisfy its validity conditions), for example, if/when a first integrity scheme (e.g., configuration) is determined to be no longer valid. If/when there are multiple integrity schemes (e.g., configurations) which are found to be valid, the WTRU may select the scheme (e.g., configuration) assigned/associated with the highest priority as the second integrity scheme (e.g., configuration).

If the WTRU determines that one or more of the PRS/SRSp schemes (e.g., configurations) and/or integrity schemes (e.g., configurations) are found to be not valid (e.g., as per the validity conditions), the WTRU may update/transfer the validity conditions of the integrity scheme (e.g., configuration). For example, if/when the WTRU determines that an integrity scheme (e.g., configuration) is no longer valid (e.g., as per the validity conditions), the WTRU may update/transfer its validity conditions (e.g., based on the validity conditions of another integrity scheme/configuration which are determined to be valid). In this case, the WTRU may change the first validity conditions (e.g., associated with the first integrity configuration) to be similar with that of the second validity conditions (e.g., associated with second integrity configuration), for example, if/when the first validity conditions expire and the second validity conditions are found to be active during the expiry of the first validity conditions. The WTRU may send an indication to the network indicating the update/transfer status of the validity conditions from one integrity scheme (e.g., configuration) to another.

The WTRU may determine positioning uncertainty/integrity using multiple PRS schemes (e.g., configurations) and a switching pattern. The WTRU may determine the positioning uncertainty (e.g., integrity) using multiple PRS schemes (e.g., first and second PRS schemes/configurations) and a switching pattern for switching between the different PRS schemes (e.g., configurations), for example, using one or more of the following.

The WTRU may receive (e.g., from an LMF) assistance information. The assistance information may contain one or more of the following: at least one default/reference PRS scheme (e.g., first PRS scheme/configuration) and one or more alternative PRS schemes (e.g., second PRS scheme/configuration); a switching pattern (e.g., indicating switching time instances for switching between the first and second PRS schemes/configurations); information on error sources (e.g., standard deviation values associated with PRS received from TPRs and error detection threshold(s) for detecting presence of errors in TRP); and/or a positioning uncertainty threshold(s) (e.g., AL, TIR, TTA).

The WTRU may determine positioning uncertainty, for example, based on measurements made using the first and second PRS schemes (e.g., configurations), switching pattern, and error sources.

If the determined positioning uncertainty is greater than or equal to a positioning uncertainty threshold, the WTRU may perform one or more of the following. If the determined positioning uncertainty is greater than or equal to a positioning uncertainty threshold, the WTRU may determine one or more error sources (e.g. TRPs) within the first and/or second PRS schemes (e.g., configurations), for example, based on measurements (e.g. RSRP is below error detection threshold). The WTRU may continue monitoring and making measurements on the identified error sources while isolating them from positioning uncertainty calculation.

If the determined positioning uncertainty is greater than or equal to a positioning uncertainty threshold, the WTRU may select an alternative PRS scheme (e.g., configuration, such as one which excludes the determined error sources).

If the determined positioning uncertainty is greater than or equal to a positioning uncertainty threshold, the WTRU may determine positioning uncertainty, for example, based on measurements made using the first/second and the selected alternative PRS scheme (e.g., configuration).

If the determined positioning uncertainty is greater than or equal to a positioning uncertainty threshold, the WTRU may send an indication to the network. The indication may indicate the status of positioning uncertainty, measurements made on determined error source(s), and the selected alternative PRS scheme (e.g., configuration).

If the determined positioning uncertainty is greater than or equal to a positioning uncertainty threshold and if measurements associated with the determined error source no longer show errors, the WTRU may perform one or more of the following: suspend using the alternative PRS configuration and resume using the previous first/second PRS configuration; determine positioning uncertainty based on measurements made using first and second PRS schemes (e.g., configurations); and/or send an indication to the network on positioning uncertainty and usage of the first/second PRS schemes (e.g., configurations).

The WTRU may send an integrity report to network. The report may include measurements made (e.g., by the WTRU) using first/second PRS schemes (e.g., configurations) and/or the determined positioning uncertainty/integrity result.

The WTRU may determine a switching pattern to apply, for example, if/when determining positioning uncertainty.

The WTRU may determine a switching pattern to apply if/when calculating/determining positioning uncertainty by using multiple PRS schemes (e.g., configurations), for example, using one or more of the following.

The WTRU may receive multiple PRS schemes (e.g., at least a primary and secondary PRS scheme/configuration), a default switching pattern, a (e.g., maximum) time duration for determining positioning uncertainty, and/or conditions for changing the switching pattern.

The WTRU may determine positioning uncertainty, for example, based on measurements made using the primary and secondary PRS schemes (e.g., configurations) and the default switching pattern.

If a condition for changing the switching pattern is detected (e.g., positioning uncertainty is above a threshold), the WTRU may determine the error source within primary/secondary PRS schemes (e.g., configurations).

If a condition for changing the switching pattern is detected (e.g., positioning uncertainty is above a threshold), the WTRU may determine an alternative switching pattern within a (e.g., max) time duration for determining positioning uncertainty, for example, such that the measurement duration if/when using the PRS scheme (e.g., configuration) without error sources (e.g. TRPs) is extended and the measurement duration if/when using the PRS scheme (e.g., configuration, such as one excluding the determined error sources) is reduced.

If a condition for changing the switching pattern is detected (e.g., positioning uncertainty is above a threshold) and if a switching pattern that satisfies (e.g., maximum) time window is not determined/found, the WTRU may perform one or more of the following: determine positioning uncertainty based on measurements made using the (e.g., best) available PRS scheme (e.g., PRS scheme/configuration with no error sources); send an indication to the network, indicating use of single PRS scheme/configuration for determining positioning uncertainty); and/or send an indication to the network on the selected switching pattern.

The WTRU may send an integrity report to network. The integrity report may include the determined positioning uncertainty result.

The WTRU may use a (e.g., preconfigured) recovery scheme (e.g., configuration) for maintaining integrity performance. The WTRU may use a preconfigured recovery scheme (e.g., configuration) for maintaining integrity performance, for example, if/when detecting a condition for triggering recovery configuration, e.g., using one or more of the following.

The WTRU may receive one or more of (e.g., multiple) PRS schemes (e.g., at least primary and secondary PRS schemes/configurations), one or more switching patterns, information on error sources (e.g., standard deviation values associated with error sources), a recovery scheme (e.g., extended/alternative TRP set and/or an alternative PRS scheme/configuration); or conditions for triggering the recovery scheme (e.g., configuration).

The WTRU may determine positioning uncertainty/integrity, for example, based on measurements made using primary and secondary PRS schemes (e.g., configurations) and information on error sources.

If a condition for triggering recovery scheme (e.g., configuration) is met (e.g., determined positioning uncertainty is above threshold value), the WTRU may send an indication to network indicating triggering of a recovery scheme (e.g., configuration) and/or determine positioning uncertainty based on measurements made using recovery scheme (e.g., configuration).

The WTRU may send an integrity report to the network. The report may include the determined positioning uncertainty result.

Figure 6:
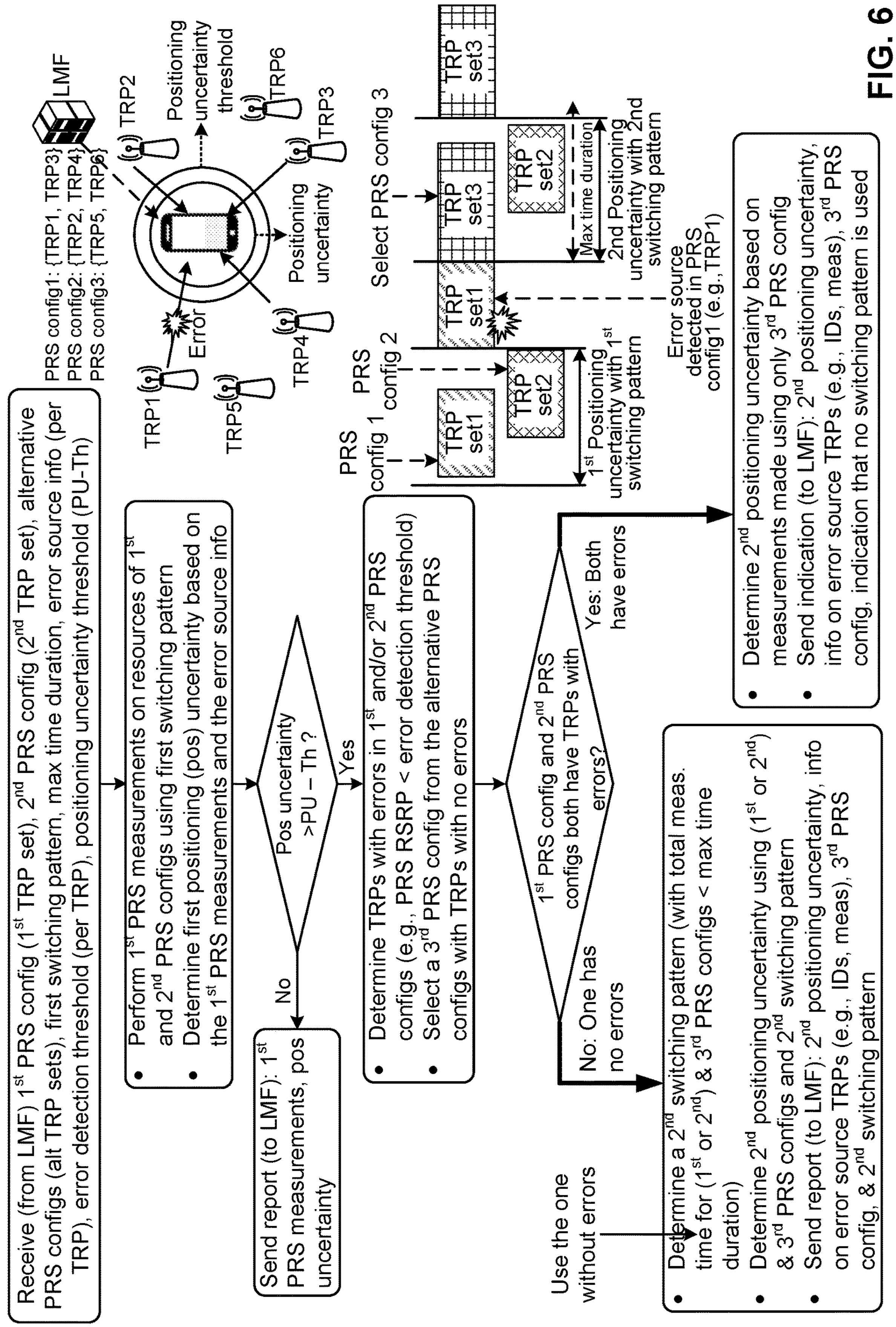
FIG. 6 illustrates an example WTRU performing measurements and determining positioning uncertainty using multiple PRS configurations.

The WTRU may determine positioning uncertainty, for example, based on a PRS configuration (e.g., multiple PRS configurations) and a switching pattern. In examples, the WTRU may determine the positioning uncertainty (e.g., positioning integrity, PL) based on at least one or more configured PRS configurations, and/or one or more switching patterns (e.g., for switching between the different PRS configurations). FIG. 6 illustrates an example WTRU performing measurements and determining positioning uncertainty using multiple PRS configurations.

In examples, the WTRU may receive configuration information (e.g., as shown in FIG. 6), for example, from the network (e.g., LMF and/or gNB). The configuration information may include one or more of the following (e.g., as shown in FIG. 6): one or more PRS configurations (e.g., a first PRS configuration, a second PRS configuration, and alternative PRS configuration(s), where each PRS configuration information may indicate a respective transmission-reception point set); one or more switching patterns; information associated with a time duration (e.g., maximum time duration); information associated with error source(s); information associated with threshold value(s) (e.g., an error detection threshold value); information associated with a positioning uncertainty threshold (e.g., AL); and/or the like.

The configuration information may include, for example, one or more PRS configurations (e.g., as shown in FIG. 6). The one or more PRS configurations may include a first PRS configuration, a second PRS configuration, and/or one or more alternative PRS configurations (e.g., a set of one or more alternative PRS configurations). The WTRU may receive first configuration information indicative of a primary PRS configuration (e.g., first PRS configuration). The WTRU may receive second configuration information indicative of a secondary PRS configuration (e.g., second PRS configuration). The WTRU may receive alternative configuration information indicative of one or more alternative PRS configuration. The configuration information (e.g., first, second, and/or alternative configuration information) may be received together and/or separately. The PRS configurations may be associated with PRS resources and/or a set of parameters. The set of parameters may include TRPs/gNBs (e.g., IDs of TRPs/gNBs from which the PRS may be received by the WTRU), bandwidth (e.g., bandwidth associated with PRS resources, which may be used by the WTRU for measurements), periodicity (e.g., periodicity of time resources and/or time slots at which the PRS may be received by the WTRU), etc.

The configuration information may include, for example, one or more switching patterns (e.g., as shown in FIG. 6). The one or more switching patterns may include at least one (e.g., first) switching pattern, which may indicate the resource(s) (e.g., time/frequency/spatial resources) that may be used by the WTRU, for example, for performing PRS measurements using the different (e.g., multiple) PRS configurations. For example, a switching pattern may indicate to (e.g., a WTRU to) use a first PRS configuration for making PRS measurements over a first time slot and a second PRS configuration for making PRS measurements over a second time slot (e.g., as shown in FIG. 6). In examples, the WTRU may receive a switching pattern (e.g., default switching pattern) to use along with different PRS configurations (e.g., if/when determining positioning uncertainty).

The configuration information may include, for example, time information associated with a time duration (e.g., maximum time duration, as shown in FIG. 6). The time information associated with the time duration may, for example, be associated with a switching pattern (e.g., different switching patterns, and different time durations, may be applied if using different PRS configurations). For example, the WTRU may use the time information associated with the time duration (e.g., maximum time duration), if/when determining a switching pattern (e.g., different and/or new switching pattern) to apply (e.g., if/when using different PRS configurations, for example, for measurements and/or determining positioning uncertainty). For switching between a first PRS configuration and a second PRS configuration, a first time (e.g., first total time) used for making at least one PRS measurement (e.g., a set of measurements) using the first PRS configuration and a second time (e.g., second total time) used for making at least one PRS measurement (e.g., set of measurements) using the second PRS configuration may be less than or equal to the maximum time duration (e.g., the first time and second time combined (e.g., a third total time) may be less than or equal to the maximum time duration).

The configuration information may include error information associated with error sources (e.g., as shown in FIG. 6). For example, the WTRU may receive one or more parameters (e.g., standard deviation values, variance values) associated with error sources. The one or more parameters may correspond to different PRS configurations and/or different parameters of the PRS configurations, which may include TRPs/gNBs, bandwidth, periodicity, etc. The parameters (e.g., standard deviation values) associated with one or more TRPs/gNBs may be used (e.g., by the WTRU), for example, if/when determining the positioning uncertainty (e.g., based on the measurements made on a respective PRS received from respective associated TRPs/gNBs).

The configuration information may include, for example, information on error detection threshold(s) (e.g., error detection threshold values, such as shown in FIG. 6, where each error detection threshold value may be per TRP). For example, the WTRU may receive one or more error detection threshold values (e.g., RSRP, RSSI, RSRQ, number of multipaths, presence of NLOS). The error detection threshold values may be associated with PRS measurements, for example, if/when using different PRS configurations and/or parameters of the PRS configurations (e.g., including TRPs/gNBs, bandwidth, periodicity, etc.). In examples, the error detection threshold values (e.g., RSRP, RSSI, RSRQ, number of multipaths, presence of NLOS) may be associated with the measurements, for example, if/when using RRM configurations and/or parameters of RRM configurations (e.g., SSB, CSI-RS).

The error detection threshold values may be used (e.g., by the WTRU) for detecting the presence of errors, for example, if/when performing measurements and/or calculations (e.g., measurements that may result in incorrect/inaccurate positioning calculation and/or positioning uncertainty calculation). In examples, the different parameters of the PRS configurations (e.g., TRPs/gNBs) may be associated with different error detection thresholds. In examples, a common (e.g., shared) error detection threshold may be applicable for detecting the presence of errors in one or more TRPs/gNBs and/or PRS configurations. The WTRU may detect the presence of errors (e.g., if/when a threshold condition is met, such as, the PRS measurements made are above/below an error detection threshold), for example, if/when performing measurement(s) of PRS received from a TRP/gNB.

The configuration information may include (e.g., as shown in FIG. 6), for example, information on a positioning uncertainty threshold (e.g., AL). For example, the WTRU may use the one or more received positioning uncertainty threshold values to determine whether the positioning uncertainty requirement is met or not met. The WTRU may determine that the positioning uncertainty requirement is not met, for example, if/when a threshold condition is met (e.g., the calculated positioning uncertainty is above/below the positioning uncertainty threshold value, e.g., as shown in FIG. 6). The WTRU may determine that the positioning uncertainty requirement is not met, for example, if/when the threshold condition is not met (e.g., calculated positioning uncertainty remains above/below the positioning uncertainty threshold value over a configured time duration).

The WTRU may perform first PRS measurements (e.g., one or more measurements and/or a set of one or more measurements) on resources indicated by the first and second PRS configurations using the first (e.g., default) switching pattern, for example, based on receiving the configuration information from network (e.g., as shown in FIG. 6). The WTRU may determine a first positioning uncertainty (e.g., as shown in FIG. 6), for example, based on the first PRS measurements and/or the information on the error sources (e.g., standard deviation values associated with the TRPs/gNBs associated with the first and second PRS configurations).

The WTRU may determine/identify one or more TRPs/gNBs (e.g., from the one or more TRPs/gNBs and/or the set of TRPs/gNBs associated the first PRS configuration and/or from the one or more TRPs/gNBS and/or the set of TRPs/gNBs associated with the second PRS configuration) as error sources, for example, if/when the determined positioning uncertainty is greater than or equal to the positioning uncertainty threshold value (e.g., as shown in FIG. 6). The WTRU may determine the TRPs/gNBs as error sources, for example, if/when determining that a threshold condition is met (e.g., the RSRP of the PRS measurements are below/above the respective error detection threshold, e.g., as shown in FIG. 6), e.g., the WTRU may determine that a certain TRP/gNB is an error source if the threshold condition is met (e.g., an RSRP of PRS measurement(s) associated with the certain TRP/gNB is below/above the error detection threshold for that TRP/gNB).

The WTRU may select a third PRS configuration. The WTRU may select a third PRS configuration from one or more alternative PRS configurations (e.g., such as from a set of alternative PRS configurations), for example, indicated by alternative configuration information (e.g., as shown in FIG. 6). The WTRU may select a third PRS configuration (e.g., from the one or more alternative PRS configurations, for example, from a set of alternative PRS configurations indicated by the alternative PRS configuration information), for example, based on determining one or more error sources (e.g., TRPs/gNBs) within the first and/or second PRS configuration. The third PRS configuration (e.g., from the set of alternative PRS configurations) may be associated with a set of TRPs/gNBs, for example, that may not include TRPs/gNBs determined to be an error source (e.g., as shown in FIG. 6).

For example, the WTRU may receive configuration information indicating a first configuration, a second configuration, a third configuration, and/or one or more alternative configurations. The WTRU may determine whether one or more error sources (e.g., TRPs/gNBs) are within the first and/or second PRS configurations (e.g., as shown in FIG. 6). The WTRU may determine whether one or more error sources (e.g., TRPs/gNBs) are within the third PRS configuration (e.g., confirm whether TRP(s)/gNB(s) identified as an error source in the first and/or second PRS configurations are not included in the third PRS configuration). Based on the determination of whether error source(s) are within the PRS configuration(s), the WTRU may select the third PRS configuration and/or an alternative PRS configuration. For example, based on a WTRU determination that there are error source(s) within the first configuration and/or second configuration, the WTRU may select the third PRS configuration (e.g., if TRP(s)/gNB(s) identified as an error source in the first and/or second PRS configurations are not included in the third PRS configuration) and/or an alternative PRS configuration. Based on a WTRU determination that there are no error source(s) within the third PRS configuration and/or the one or more alternative PRS configurations, the WTRU may select the third PRS configuration and/or an alternative PRS configuration. Based on a WTRU determination that there are error source(s) within the first PRS configuration and/or second PRS configuration and that there are no and/or fewer error source(s) (e.g., as compared with the first PRS configuration and/or second PRS configuration) within the third PRS configuration and/or alternative PRS configuration, the WTRU may select the third PRS configuration and/or an alternative PRS configuration.

In examples, the WTRU may determine that the first PRS configuration does not contain any error sources for example, if a threshold condition is met (e.g., RSRP measurements made on a PRS received from TRPs/gNBs associated with the first PRS configuration are below/above the error detection threshold indicating presence of no error sources; the measurements associated with the first PRS configuration are valid). The WTRU may determine a third PRS configuration (e.g., from one or more alternative PRS configurations (e.g., without any error sources), for example, such as from a first alternative PRS configuration or a second alternative PRS configuration and/or from a set of alternative PRS configurations) and a second switching pattern, for example, such that the total measurement time using the first PRS configuration and the third PRS configuration is less than or equal to the maximum time duration. The WTRU may determine a third PRS configuration and a second switching pattern, for example, if the WTRU determines the first PRS configuration does not contain any error sources (e.g., RSRP measurements made on a PRS received from TRPs/gNBs associated with the first PRS configuration are below/above the error detection threshold indicating presence of no error sources), for example, as shown in FIG. 6 (e.g., regardless of whether a determination on whether the second PRS configuration does not contain any error sources is performed or not). The WTRU may determine a second positioning uncertainty, for example, based on at least the measurements made using the first PRS configuration, the third PRS configuration, the second switching pattern, and the information on error sources. The WTRU may send an indication to the network (e.g., LMF and/or gNB), for example, where the indication may indicate the determined second positioning uncertainty, the error source(s) (e.g., IDs of TRPs/gNBs determined as error sources and associated PRS measurements), the third PRS configuration, and/or the second switching pattern, for example.

In examples, the WTRU may determine that the first PRS configuration may contain one or more error sources (e.g., TRPs/gNBs determined to be error sources) and the second PRS configuration does not contain any error sources (e.g., RSRP measurements made on a PRS received from TRPs/gNBs associated with the second PRS configuration are below/above the error detection threshold indicating presence of no error sources; the measurements associated with the second PRS configuration are valid), e.g., as shown in FIG. 6. The WTRU may determine a third PRS configuration (e.g., from the set of alternative PRS configurations, for example, without any error sources) and a second switching pattern, for example, such that the total measurement time using the second PRS configuration and the third PRS configuration is less than or equal to the maximum time duration (e.g., as shown in FIG. 6). The WTRU may determine the third PRS configuration and second switching pattern, for example, if the WTRU determines that the first PRS configuration contains one or more error sources and/or the second PRS configuration does not contain any error sources (e.g., as shown in FIG. 6). The WTRU may determine a second positioning uncertainty, for example, based on at least the measurements made using the second PRS configuration, the third PRS configuration, the second switching pattern, and the information on error sources (e.g., as shown in FIG. 6). The WTRU may send an indication to the network (e.g., LMF and/or gNB), for example, where the indication may indicate the determined second positioning uncertainty, the error source(s) (e.g., IDs of TRPs/gNBs determined as error sources and associated PRS measurements), the second PRS configuration, the third PRS configuration, and/or the second switching pattern, for example (e.g., as shown in FIG. 6).

In examples, the WTRU may determine that the first PRS configuration and second PRS configuration may contain one or more error sources (e.g., TRPs/gNBs determined to be error sources), e.g., as shown in FIG. 6. The WTRU may determine to use the third PRS configuration for performing measurements and determining positioning uncertainty (e.g., without a switching pattern), for example, if the WTRU determines that the first PRS configuration and second PRS configuration contain one or more error sources (e.g., as shown in FIG. 6). In this case, the WTRU may use the third PRS configuration for measurements (e.g., the third PRS configuration and not other PRS configurations), for example, over a time duration which may span up to the maximum time duration (e.g., without switching). The WTRU may determine a second positioning uncertainty based on measurements made using the third PRS configuration. In examples, on a condition that the first and second PRS configurations (e.g., any of the first and second PRS configurations) are associated with any error sources (e.g., TRPs/gNBs), e.g., as shown in FIG. 6, the second positioning uncertainty may be determined, based on the PRS configuration that is not associated with any error sources (e.g., the third PRS configuration). As shown in FIG. 6, the WTRU may send an indication to the network (e.g., LMF and/or gNB), for example, where the indication may indicate one or more of the following: the second positioning uncertainty, the error source(s) (e.g., IDs of TRPs/gNBs determined as error sources and associated PRS measurements), the third PRS configuration, or an indication that no switching pattern was used, for example.

Supporting for supporting positioning integrity with multiple positioning schemes (e.g., configurations) based on dynamic selection (e.g., reselection) of positioning schemes (e.g., configurations) may be provided.

A WTRU may select (e.g., reselect) a positioning scheme (e.g., configuration) from a configured set or configured pool, e.g., based on detection of configured triggering conditions. In examples, a WTRU may be configured to support multiple positioning schemes (e.g., configurations), e.g., which may include a first (e.g., primary) and a second (e.g., secondary) positioning configuration/scheme (e.g., at least a first and a second positioning configuration/scheme, which may be used to determine integrity or uncertainty in the WTRU location information. The WTRU may select (e.g., reselect) positioning schemes (e.g., configurations) from a set or pool or one or more alternative positioning schemes (e.g., configurations), e.g., based on configuration selection criteria such that the integrity or uncertainty in the WTRU location remains below a certain configured threshold (e.g., a PL threshold, an AL, a TIR).

A WTRU may be configured with one or more positioning schemes/configurations, e.g., based on WTRU capability. The positioning schemes/configurations (e.g., different positioning schemes/configurations) in the WTRU may be for WTRU-based or LMF-based positioning (e.g., either WTRU-based or LMF-based positioning). In examples, the WTRU may be configured or preconfigured (e.g., via assistance data from an LMF and/or an RRC from an RAN) with the configuration parameters and resources, e.g., to be applied if using different positioning schemes (e.g., configurations).

A positioning scheme (e.g., configuration) may be configured as a default scheme (e.g., configuration), for example, which may be used in encountering failure or errors in the primary or secondary positioning scheme (e.g., configuration). In examples, the primary or a secondary positioning scheme (e.g., configuration) may be used for supporting integrity. In examples, the primary and secondary positioning schemes/configurations (e.g., both the primary and secondary positioning schemes/configurations) may be used (e.g., concurrently used or sequentially used) for supporting or determining integrity.

In examples, a WTRU may be configured to select (e.g., reselect, dynamically select, dynamically reselect) a positioning configuration/scheme, e.g., based on a detection of one or more conditions (e.g., triggering conditions). A WTRU may perform (e.g., if detecting at least one triggering condition and the WTRU is configured to dynamically select (e.g., reselect) a positioning configuration/scheme) one or more of the following: the WTRU may select (e.g., autonomously select) from a preconfigured set of positioning configurations/schemes based on a selection criterion; the WTRU may derive or determine the scheme (e.g., configuration) to be used as a primary and/or secondary positioning scheme (e.g., configuration) based on a preconfigured derivation criterion and information on error sources; a WTRU may send an indication to a network (e.g., an RAN or an LMF) for receiving one or more position configuration information and/or activation messages to activate preconfigured positioning schemes (e.g., configurations) which may be selected by a network, and/or a WTRU may send an indication to a network if detecting an error source or error event (e.g., at least one error source or error event) associated with the primary and/or secondary positioning scheme.

In examples, the WTRU may select (e.g., autonomously select) from a preconfigured set of positioning configurations/schemes based on a selection criterion, e.g., if the WTRU detects a triggering condition (e.g., at least one triggering condition). In examples, the selection criterion may include selecting a positioning scheme/configuration (e.g., as a primary and/or secondary scheme/configuration), e.g., such that the impact from one or more error sources which may be active or triggered during a selection duration/window is minimized. In examples, the impact from the error sources on the positioning schemes (e.g., configurations) may be minimized, e.g., by using a non-overlapping set of positioning sources (e.g., TRPs, gNBs) or using a set of positioning sources (e.g., minimally overlapping set of positioning sources) between the primary and secondary positioning configurations/schemes.

In examples, the WTRU may derive or determine the scheme (e.g., configuration) to be used as a primary and/or secondary positioning scheme (e.g., configuration) based on a preconfigured derivation criterion and information on error sources, e.g., if the WTRU detects a triggering condition (e.g., at least one triggering condition). In examples, the derivation criterion may include determining the resources for positioning (e.g., PRS resources) from a resource pool, e.g., such that the impact from the error sources may be minimized (e.g., minimizing overlapping positioning sources).

In examples, the WTRU may send an indication to a network (e.g., an RAN or an LMF) for receiving one or more positioning schemes (e.g., configurations) and/or activation messages to activate preconfigured positioning schemes (e.g., configurations) which may be selected by a network, e.g., if the WTRU detects a triggering condition (e.g., at least one triggering condition). In examples, the WTRU may send in an indication a request for a positioning configuration (e.g., on an on-demand basis) and/or integrity status information (e.g., information on triggering conditions, error sources, a calculated PL).

In examples, the WTRU may send an indication to a network, e.g., if detecting an error source or error event (e.g., at least one error source or error event) associated with the primary and/or secondary positioning scheme. In examples, the error source or error event may be detected, e.g., based on measurements made from the PRS received from a positioning source (e.g., a TRP or a gNB) associated with the primary and/or secondary positioning scheme. In this case, an error source or error event may be detected, e.g., if the measurements of the PRS (e.g. an RSRP) fluctuate above or below a threshold (e.g., a configured threshold) over a time duration.

Triggering conditions for selecting or switching positioning schemes (e.g., configurations) for determining integrity may be provided. Based on receiving configuration information associated with a set comprising one or more positioning schemes/configurations, the WTRU may select (e.g., reselect) a positioning scheme/configuration (e.g., at least one positioning scheme/configuration) as a primary scheme/configuration and/or a secondary positioning scheme/configuration, e.g., from a set indicated by configuration information based on one or more of the following: a higher layer indication, a network indication from an RAN or an LMF, an expiration of a duration of time (e.g., via a timer) associated with a positioning configuration/scheme, an integrity calculation trigger, a detection of an error source or an error event, a change in integrity configuration parameters, a change in a WTRU status or radio environment.

In examples, a higher layer indication may be a triggering condition, e.g., a WTRU may select (e.g., reselect) the positioning schemes (e.g., configurations), e.g., based on receiving a signaling (e.g., higher layer signaling and/or indication, such as, for example, MO-LR, MT-LR). In examples, a network indication from an RAN or an LMF may be a triggering condition, e.g., a WTRU may select (e.g., reselect) if triggered by an LMF (e.g., via LPP signaling) or an RAN (e.g., via signaling such as via RRC signaling, MAC signaling, or signaling via a physical layer (PHY)). In examples, an expiration of a duration (e.g., via a timer) associated with a positioning configuration/scheme may be a triggering condition, e.g., the WTRU may select (e.g., reselect) based on the expiration of a duration of time. For example, a duration may be measured in seconds, microseconds, counts of a system frame number, and the like. The duration of time may start when beginning to use a positioning scheme for a configured time duration.

In examples, an integrity calculation trigger may be a triggering condition. A WTRU may select (e.g., reselect) if/when a determined one or more positioning integrity or uncertainty values exceed an integrity threshold (e.g. an AL)

and/or remains above the threshold over a configured duration. The WTRU may trigger and/or select (e.g., reselect) one or more positioning schemes (e.g., configurations), for example, if the integrity determined using a single positioning scheme (e.g., configuration) exceeds an integrity threshold or fluctuates.

In examples, a detection of an error source or error events may be a triggering condition. The WTRU may select (e.g., reselect) if detecting error sources and/or error events associated with the configured positioning schemes (e.g., configurations), e.g., which may include timing or angle measurement errors, WTRU clock drift, a change in radio environments, and the like.

In examples, a change in integrity scheme (e.g., configuration) parameters may be a triggering condition. The WTRU may be configured with one or more integrity scheme (e.g., configuration) parameters, which may include a selection window and/or a set of ranking/priority values associated with one or more candidate positioning schemes (e.g., configurations). The WTRU may select (e.g., reselect) the one or more positioning schemes (e.g., configurations) used for determining integrity, for example, if triggered by a change in the selection window and/or priority values.

In examples, a change in a WTRU status or environment may be a triggering condition. The WTRU may select (e.g., reselect) if one or more changes associated with WTRU mobility (e.g., an increase in WTRU speed) or a WTRU environment (e.g., presence of multipath, blockages between a TRP or gNB, movement from indoor to outdoor and vice-versa) are detected.

A WTRU may select (e.g., reselect) a positioning scheme (e.g., configuration) for integrity, e.g., based on a configured selection window. In examples, a WTRU may select (e.g., reselect) a positioning scheme (e.g., configuration) to be used in conjunction with a primary positioning scheme (e.g., configuration), e.g., for determining integrity based on a selection window. A WTRU may use a number of positioning schemes/configurations (e.g., a limited number of positioning schemes/configurations), which may restrict the ability for determining integrity using multiple positioning schemes (e.g., configurations), e.g., based on WTRU capability. It may be helpful to select a secondary positioning scheme (e.g., configuration) to be used with the primary scheme (e.g., configuration) such that the delay incurred and/or resources used (e.g., for determining the positioning information) between the primary and secondary schems (e.g., configurations) is below an integrity related threshold or window.

The WTRU may initially receive from a network, the configuration information for one or more positioning schemes/configurations (e.g. PRS schemes/configurations) in assistance data, for example. The WTRU may receive (e.g., from higher layers and/or the network) the integrity KPIs/thresholds (e.g., requirements) and the indication to use multiple positioning schemes (e.g., configurations), for example, if determining integrity. The primary/reference positioning scheme (e.g., configuration) may be selected by the WTRU based on a selection criterion (e.g. a presence of minimal or no error sources) or by the network and indicated to the WTRU in assistance information, for example.

A WTRU may receive one or more selection window parameters (e.g., from the network or higher layers) which may be a function of the maximum time or frequency resources and/or delay for determining or calculating integrity, for example, if using a primary and a secondary positioning scheme (e.g., configuration). In this case, the WTRU may apply the configured selection window for selecting a secondary positioning scheme (e.g., configuration) such that the primary and secondary schemes (e.g., configurations) are aligned (e.g., in terms of the resource usage) and/or the integrity or uncertainty may be determined within the selection window time duration or frequency band.

The selection window may be configured (e.g., semi-statically configured) in the WTRU (e.g. in the assistance data) or changed dynamically (e.g., by either the WTRU or network). For dynamic usage/selection of the selection window, the WTRU may change the duration/resources of the selection window or select a selection window from one or more selection windows (e.g., pre-configured selection windows), e.g., based on certain triggering conditions (e.g. change in the WTRU mobility status).

For network assisted selection of the selection window, the WTRU may indicate to a network a request for either aligning between the different positioning schemes (e.g., configurations) for integrity or a request for changing the selection window, for example. In this case, along with the request to alignment/change, the WTRU may indicate to network (e.g., via an RRC/LPP signaling or lower layer indications, such as via MAC CE signaling, UCI, etc.), at least one or more of the following: information on a WTRU status (e.g., mobility), an integrity status, or a proposed selection window. In response, the network may configure the resources and/or measurement gaps with a timing (e.g., appropriate timing), e.g., such that the positioning information/measurements and integrity may be determined within a changed/proposed selection window.

A selection window with a shorter delay duration may be used/selected, for example, if the WTRU mobility/speed increases such that the difference between the positioning information determined using the primary and secondary scheme (e.g., configuration) is minimized. A selection window with a longer duration may be used/selected to account for minimal/no change in the WTRU positioning information, for example, if the WTRU is stationary.

A WTRU may select (e.g., reselect) positioning scheme(s) (e.g., configuration(s)) based on associated priority values.

In examples, the WTRU may select (e.g., reselect) one or more positioning schemes (e.g., configurations) for determining/ensuring integrity, e.g., based on the priority values associated with the positioning schemes (e.g., configurations). The WTRU may select from a set of configured (e.g., preconfigured) candidate positioning schemes (e.g., configurations) for primary and/or secondary schemes (e.g., configurations). The WTRU may select from a set of configured (e.g., preconfigured) candidate positioning schemes (e.g., configurations) for primary and/or secondary schemes (e.g., configurations), e.g., based on a selection rule that may be a function of the priority associated with the candidate positioning schemes (e.g., configurations) and other transmissions (e.g., data, or other RS).

The WTRU may select a positioning scheme (e.g., configuration) based on the order of priority. The priority associated/assigned to a positioning scheme (e.g., configuration) may be a function of one or more factors, where the assigned priority value may be proportional to the following: a number and/or magnitude of impacting error sources or error events, a persistence duration of error sources, a delay for determining or calculating a WTRU location, a WTRU radio environment, a QoS threshold (e.g., requirement) for positioning (e.g., accuracy, latency), an ability for power saving, and/or a time or location profile of error sources.

An assigned priority value may be proportional to a number and/or magnitude of impacting error sources/error events. For example, if the primary positioning scheme (e.g., configuration) applied is DL-TDoA, the selection of DL-AoD as a secondary positioning scheme (e.g., configuration) may have shorter delay compared to selection of UL-SRSp. A DL-AoD may be assigned with lower priority because both DL-TDoA and DL-AoD are impacted by similar error sources. A candidate positioning scheme (e.g., configuration) may be assigned with a lower priority if an associated error source is detected (e.g. loss of LOS, high multipath), e.g., prior to or during the selection.

An assigned priority value may be proportional to a persistence duration of error sources. For example, a positioning scheme/configuration with associated error sources that may have a longer persistence duration may be assigned with a lower priority. In examples, a positioning scheme/configuration with associated error sources that may have a shorter persistence duration may be assigned with a higher priority.

An assigned priority value may be proportional to a delay for determining/calculating a WTRU location. For example, a positioning scheme/configuration which may require longer delay for determining/calculating a WTRU location may be assigned with a lower priority. In examples, a positioning scheme/configuration which may use (e.g., require) a shorter delay for determining/calculating a WTRU location may be assigned with higher priority.

An assigned priority value may be proportional to a WTRU radio environment. For example, a positioning scheme (e.g., configuration) that may be more robust and supported in a dense radio environment (e.g., a dense radio environment) may be assigned with high priority when the WTRU is in such environment. For example, a positioning scheme (e.g., configuration) based on GNSS may be assigned with a lower priority if/when the WTRU is in indoor environment.

An assigned priority value may be proportional to a QoS threshold (e.g., requirement) for positioning (e.g., accuracy, latency). For example, a positioning scheme (e.g., configuration) that may be supported for a positioning service with a high QoS may be assigned with a higher priority compared to a positioning service with a moderate/low QoS An assigned priority value may be proportional to an ability for power saving. For example, a positioning scheme (e.g., configuration) that may result in lower power consumption (e.g. at the WTRU) may be assigned with a high priority.

An assigned priority value may be proportional to a time/location profile of error sources. For example, the priority value may be assigned based on whether the error sources with a positioning scheme (e.g., configuration) are active (e.g., probability that an error source is active is higher than a threshold). In this case, a positioning scheme (e.g., configuration) whose associated error sources are active may be assigned with a low priority.

In examples, the priority assigned for the positioning schemes (e.g., configurations) may be determined either by the WTRU or by the network, e.g., based on ranking and/or suitability of the positioning schemes (e.g., configurations) for determining integrity with a criteria (e.g. low latency, a PL below an integrity threshold). In the case where the network determines the priority, the WTRU may receive the priority of the positioning schemes (e.g., configurations) either semi-statically (e.g., by LPP/RRC signaling) or dynamically (e.g., lower layer signaling including MAC CE signaling or DCI).

Figure 7:
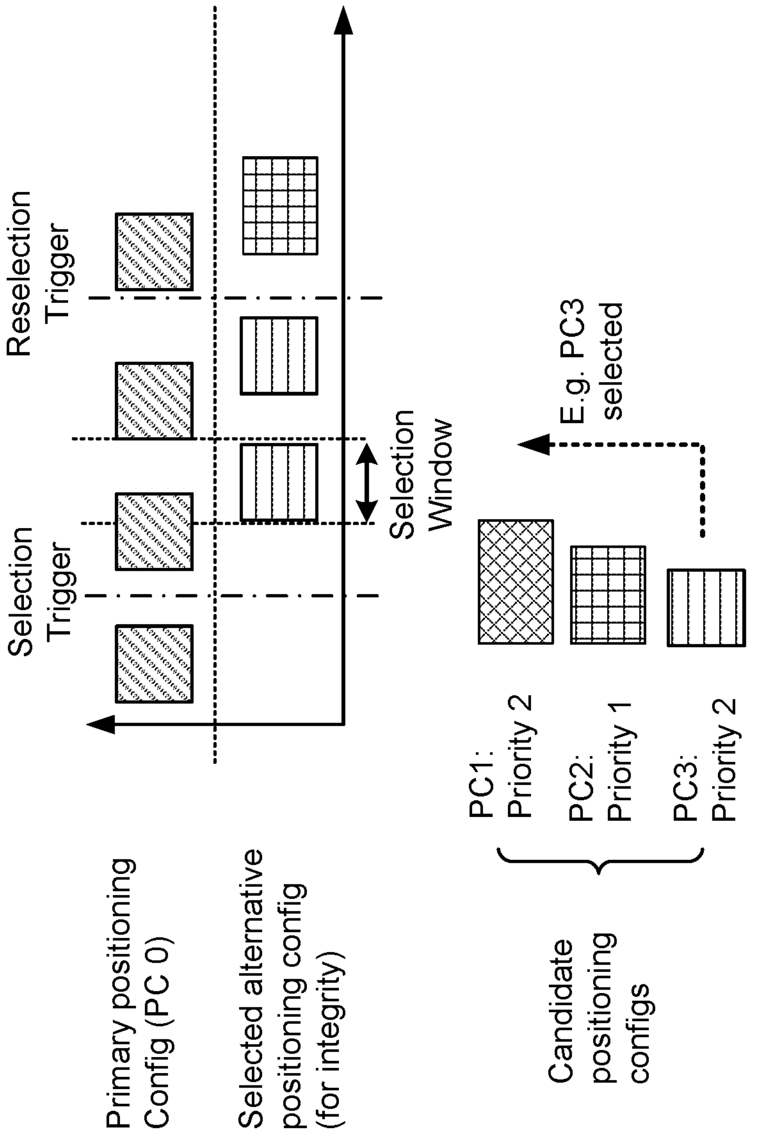
FIG. 7 is a diagram illustrating an example WTRU selecting positioning configurations.

FIG. 7 illustrates a WTRU selecting a secondary positioning scheme (e.g., configuration) to be used in conjunction with a primary scheme/configuration (e.g., reference scheme/configuration) within a preconfigured selection window (e.g., a delay) to prevent the positioning uncertainty/integrity from deteriorating.

The WTRU may determine a secondary PRS scheme (e.g., configuration) to be used along with a primary PRS scheme (e.g., configuration), for example, based on a (e.g., configured) selection time window and a priority. The WTRU may determine a secondary PRS scheme (e.g., configuration) from a set of (e.g., alternative) PRS schemes (e.g., configurations) to be used along with a primary PRS scheme (e.g., configuration) based on a (e.g., configured) selection time window and a priority associated with alternative PRS schemes (e.g., configurations), for example, using one or more of the following.

The WTRU may receive a primary and secondary PRS scheme (e.g., configuration) and one or more of a set comprising one or more alternative PRS schemes (e.g., configurations), a positioning uncertainty threshold (e.g., AL, TIR, TTA), selection conditions, a selection time window (e.g., max time allowed for determining positioning uncertainty), or priority values associated with alternative PRS configurations.

The WTRU may determine positioning uncertainty, for example, based on measurements made using the primary and secondary PRS schemes (e.g., configurations).

If a selection condition is detected (e.g., determined positioning uncertainty is above a threshold value), the WTRU may select (e.g., reselect) a secondary PRS scheme (e.g., configuration) from the set of alternative PRS schemes (e.g., configurations) with highest priority value, for example, such that positioning uncertainty can be determined within the selection time window.

If a selection condition is detected (e.g., determined positioning uncertainty is above a threshold value), and if a secondary PRS configuration that satisfies selection time window is not selected/found, the WTRU may determine positioning uncertainty based on measurements made using the (e.g., best) available PRS configuration (e.g., PRS configuration with no error sources) and/or send an indication to the network, indicating use of a single PRS configuration for determining positioning uncertainty.

If a selection condition is detected (e.g., determined positioning uncertainty is above a threshold value), the WTRU may determine positioning uncertainty based on PRS measurements made using primary PRS scheme (e.g., configuration) and selected secondary PRS scheme (e.g., configuration).

The WTRU may send an integrity report to network indicating (e.g., containing) the determined positioning uncertainty result.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU) comprising:
a processor configured to:
receive a first subset of positioning reference signal (PRS) configuration information, a second subset of PRS configuration information, and a third subset of PRS configuration information;
receive configuration information indicating error source information, a first switching pattern, and a positioning uncertainty threshold;
perform a first set of measurements using the first switching pattern, the first subset of PRS configuration information, and the second subset of PRS configuration information;
determine a first positioning uncertainty based on the first set of measurements and the error source information;
determine that the first positioning uncertainty is greater than the positioning uncertainty threshold; and
send, based on the determination that the first positioning uncertainty is greater than the positioning uncertainty threshold, an indication indicating measurement information and positioning uncertainty information.

2. The WTRU of claim 1, wherein the processor is further configured to:
determine that there is an error source associated with the first subset of PRS configuration information based on the first set of measurements and a threshold indicated in the error source information, wherein the error source is a transmission-reception point (TRP) indicated in the first subset of PRS configuration information;
perform a second set of measurements using the second subset of PRS configuration information and the third subset of PRS configuration information; and
determine a second positioning uncertainty based on the second set of measurements and the error source information, wherein the measurement information comprises the second set of measurements, and wherein the positioning uncertainty information comprises the second positioning uncertainty.

3. The WTRU of claim 2, wherein the processor is further configured to:
select, based on the determination that there is an error source associated with the first subset of PRS configuration information and a determination that a third set of measurements associated with the second subset of PRS configuration information are valid, the second subset of PRS configuration information and the third subset of PRS configuration information to perform the second set of measurements, wherein the third set of measurements are from the first set of measurements.

4. The WTRU of claim 2, wherein the configuration information indicates a maximum time duration, wherein the second set of measurements is performed using a second switching pattern, and wherein the processor is further configured to determine the second switching pattern based on the second subset of PRS configuration information, the third subset of PRS configuration information, and the maximum time duration.

5. The WTRU of claim 4, wherein the measurement information further comprises one or more of the first subset of PRS configuration information, the second subset of PRS configuration information, the third subset of PRS configuration information, the first set of measurements, the first switching pattern, or the second switching pattern.

6. The WTRU of claim 1, wherein the first subset of PRS configuration information indicates a first set of transmission-reception points (TRPs), wherein the second subset of PRS configuration information indicates a second set of TRPs, and wherein the third subset of PRS configuration information indicates a third set of TRPs.

7. The WTRU of claim 1, wherein the measurement information comprises the first set of measurements, and wherein the positioning uncertainty information comprises the first positioning uncertainty.

8. The WTRU of claim 1, wherein the first subset of PRS configuration information indicates a first set of PRS resources and a first set of parameters, wherein the second subset of PRS configuration information indicates a second set of PRS resources and a second set of parameters, and wherein the third subset of PRS configuration information indicates a third set of PRS resources and a third set of parameters.

9. The WTRU of claim 1, wherein the processor is further configured to:
perform a second set of measurements using the third subset of PRS configuration information; and
determine a second positioning uncertainty based on the second set of measurements and the error source information, wherein the measurement information comprises the second set of measurements, and wherein the positioning uncertainty information comprises the second positioning uncertainty.

10. The WTRU of claim 9, wherein the processor is further configured to:
determine that there is a first error source associated with the first subset of PRS configuration information and a second error source associated with the second subset of PRS configuration information, wherein the determination is based on the first set of measurements, a first threshold indicated by the error source information, and a second threshold indicated by the error source information; and
select the third subset of PRS configuration information based on the determination that there is a first error source associated with the first subset of configuration information and a second error source associated with the second subset of configuration information, wherein the measurement information further comprises the third subset of PRS configuration information.

11. A method comprising:
receiving a first subset of positioning reference signal (PRS) configuration information, a second subset of PRS configuration information, and a third subset of PRS configuration information;

receiving configuration information indicating error source information, a first switching pattern, and a positioning uncertainty threshold;

performing a first set of measurements using the first switching pattern, the first subset of PRS configuration information, and the second subset of PRS configuration information;

determining a first positioning uncertainty based on the first set of measurements and the error source information;

determining that the first positioning uncertainty is greater than the positioning uncertainty threshold; and sending, based on the determination that the first positioning uncertainty is greater than the positioning uncertainty threshold, an indication indicating measurement information and positioning uncertainty information.

12. The method of claim 11, wherein the method further comprises:

determining that there is an error source associated with the first subset of PRS configuration information based on the first set of measurements and a threshold indicated in the error source information, wherein the error source is a transmission-reception point (TRP) indicated in the first subset of PRS configuration information;

performing a second set of measurements using the second subset of PRS configuration information and the third subset of PRS configuration information; and determining a second positioning uncertainty based on the second set of measurements and the error source information, wherein the measurement information comprises the second set of measurements, and wherein the positioning uncertainty information comprises the second positioning uncertainty.

13. The method of claim 12, wherein the method further comprises:

selecting, based on the determination that there is an error source associated with the first subset of PRS configuration information and a determination that a third set of measurements associated with the second subset of PRS configuration information are valid, the second subset of PRS configuration information and the third subset of PRS configuration information to perform the second set of measurements, wherein the third set of measurements are from the first set of measurements.

14. The method of claim 12, wherein the configuration information indicates a maximum time duration, wherein the second set of measurements is performed using a second switching pattern, and wherein the method further comprises determining the second switching pattern based on the second subset of PRS configuration information, the third subset of PRS configuration information, and the maximum time duration.

15. The method of claim 14, wherein the measurement information further comprises one or more of the first subset of PRS configuration information, the second subset of PRS configuration information, the third subset of PRS configuration information, the first set of measurements, the first switching pattern, or the second switching pattern.

16. The method of claim 11, wherein the first subset of PRS configuration information indicates a first set of transmission-reception points (TRPs), wherein the second subset of PRS configuration information indicates a second set of TRPs, and wherein the third subset of PRS configuration information indicates a third set of TRPs.

17. The method of claim 11, wherein the measurement information comprises the first set of measurements, and wherein the positioning uncertainty information comprises the first positioning uncertainty.

18. The method of claim 11, wherein the first subset of PRS configuration information indicates a first set of PRS resources and a first set of parameters, wherein the second subset of PRS configuration information indicates a second set of PRS resources and a second set of parameters, and wherein the third subset of PRS configuration information indicates a third set of PRS resources and a third set of parameters.

19. The method of claim 11, wherein the method further comprises:

performing a second set of measurements using the third subset of PRS configuration information; and determining a second positioning uncertainty based on the second set of measurements and the error source information, wherein the measurement information comprises the second set of measurements, and wherein the positioning uncertainty information comprises the second positioning uncertainty.

20. The method of claim 19, wherein the method further comprises:

determining that there is a first error source associated with the first subset of PRS configuration information and a second error source associated with the second subset of PRS configuration information, wherein the determination is based on the first set of measurements, a first threshold indicated by the error source information, and a second threshold indicated by the error source information; and selecting the third subset of PRS configuration information based on the determination that there is a first error source associated with the first subset of configuration information and a second error source associated with the second subset of configuration information, wherein the measurement information further comprises the third subset of PRS configuration information.

* * * * *